(12) United States Patent
Arai et al.

(10) Patent No.: US 12,509,311 B2
(45) Date of Patent: Dec. 30, 2025

(54) TRANSPORT SYSTEM

(71) Applicant: JAPAN CASH MACHINE CO., LTD., Osaka (JP)

(72) Inventors: Hirokazu Arai, Osaka (JP); Toshitaka Nishizaki, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 180 days.

(21) Appl. No.: 18/408,383

(22) Filed: Jan. 9, 2024

(65) Prior Publication Data

US 2024/0239618 A1 Jul. 18, 2024

(30) Foreign Application Priority Data

Jan. 12, 2023 (JP) ................... 2023-003269

(51) Int. Cl.
*B65G 51/02* (2006.01)
*B65G 51/36* (2006.01)
*B65G 54/02* (2006.01)

(52) U.S. Cl.
CPC ............ *B65G 51/36* (2013.01); *B65G 54/02* (2013.01); *B65G 2203/043* (2013.01)

(58) Field of Classification Search
None
See application file for complete search history.

(56) References Cited

U.S. PATENT DOCUMENTS

| | | | | |
|---|---|---|---|---|
| 3,068,372 | A | * | 12/1962 | Francis ............... H02K 49/043 310/93 |
| 4,400,715 | A | * | 8/1983 | Barbee ............... H10D 84/038 257/E21.537 |
| 4,805,761 | A | * | 2/1989 | Totsch .................. B65G 54/02 198/690.1 |

(Continued)

FOREIGN PATENT DOCUMENTS

| | | |
|---|---|---|
| JP | H09-142655 A | 6/1997 |
| JP | 3098000 B2 | 10/2000 |

(Continued)

OTHER PUBLICATIONS

Japan Patent Office, Office Action (with English Translation) issued in Japanese Patent Application No. 2023-003269, 8 pages.

*Primary Examiner* — Joseph A Dillon, Jr.
(74) *Attorney, Agent, or Firm* — MASUVALLEY & PARTNERS; Peter Martinez

(57) ABSTRACT

A transport system 10C has a configuration to move a transport body 500 in conjunction with movement of a moving body 200 by using repulsion based on a magnetic force applied between moving body magnets 213 and a transport body magnet 523 when there is a proximal positional relation between these magnets. The transport system 10C includes a control coil 903 that controls a traveling state of the moving body 200, and a coil drive control unit that drives and controls the control coil. The control coil 903 is configured to apply a magnetic force to the moving body magnets 213. The coil drive control unit supplies the control (Continued)

coil 903 with power to cause the control coil 903 to attract the moving body magnets 213 against an air flow flowing within an air blowing tube 100 in order to control and prevent the moving body 200 from traveling.

25 Claims, 19 Drawing Sheets

(56) References Cited

U.S. PATENT DOCUMENTS

| | | | | |
|---|---|---|---|---|
| 5,388,526 | A * | 2/1995 | Imai | B65G 54/025 |
| | | | | 104/138.1 |
| 6,622,911 | B1 * | 9/2003 | Holland-Letz | G07D 11/22 |
| | | | | 902/8 |
| 9,873,574 | B2 * | 1/2018 | Kakuho | H05K 13/028 |
| 10,432,117 | B1 * | 10/2019 | Huang | H02P 7/025 |
| 10,699,928 | B2 * | 6/2020 | Motoori | H01L 21/6773 |
| 10,720,864 | B2 * | 7/2020 | Huang | H02K 11/35 |
| 11,091,320 | B2 * | 8/2021 | King | B65G 54/02 |
| 11,198,568 | B2 * | 12/2021 | Ragan | B65G 45/10 |
| 11,430,683 | B2 * | 8/2022 | Raatz | B65G 54/02 |
| 11,756,363 | B2 * | 9/2023 | Robinson | B65H 43/04 |
| | | | | 271/306 |
| 11,988,704 | B2 * | 5/2024 | Liu | G01R 31/14 |
| 12,024,398 | B2 * | 7/2024 | Itotani | B65H 7/06 |
| 12,062,259 | B2 * | 8/2024 | Rusakov | B65H 29/52 |
| 12,148,261 | B2 * | 11/2024 | Nishimura | G07D 11/13 |
| 12,269,704 | B2 * | 4/2025 | Ichikawa | B65H 5/004 |
| 12,344,483 | B2 * | 7/2025 | Hogan | B65G 43/10 |
| 2005/0200072 | A1 * | 9/2005 | Sawayama | G07D 11/14 |
| | | | | 271/207 |
| 2009/0114503 | A1 * | 5/2009 | Takai | G07D 7/00 |
| | | | | 194/206 |
| 2011/0130870 | A1 * | 6/2011 | Aoji | G07F 9/10 |
| | | | | 700/218 |
| 2014/0123871 | A1 * | 5/2014 | Dehmel | B61D 15/00 |
| | | | | 105/355 |
| 2015/0291378 | A1 * | 10/2015 | Ogura | B65H 5/26 |
| | | | | 271/194 |
| 2016/0114989 | A1 * | 4/2016 | Hibbs | H01L 21/67736 |
| | | | | 414/800 |
| 2016/0159585 | A1 * | 6/2016 | Wernersbach | B65G 54/025 |
| | | | | 198/619 |
| 2016/0368715 | A1 * | 12/2016 | Kakuho | H05K 13/028 |
| 2021/0122576 | A1 * | 4/2021 | Jones | B65G 35/06 |
| 2022/0001902 | A1 * | 1/2022 | Araie | B61B 3/02 |
| 2022/0297961 | A1 * | 9/2022 | Ichikawa | B65G 51/04 |
| 2022/0301382 | A1 * | 9/2022 | Saji | B65H 29/58 |
| 2023/0211969 | A1 * | 7/2023 | Itotani | B65H 5/062 |
| | | | | 271/227 |
| 2023/0316843 | A1 * | 10/2023 | Nakatake | B65G 54/025 |
| | | | | 406/11 |
| 2023/0416039 | A1 * | 12/2023 | Ichikawa | B65H 43/00 |
| 2024/0054846 | A1 * | 2/2024 | Nishimura | B65H 31/30 |
| 2024/0085893 | A1 * | 3/2024 | Hofmann | B65G 54/02 |
| 2024/0208752 | A1 * | 6/2024 | Nishimura | B65H 5/006 |
| 2024/0208760 | A1 * | 6/2024 | Yamamoto | B65H 5/38 |
| 2024/0228194 | A1 * | 7/2024 | Shingai | B65H 5/04 |
| 2024/0239618 | A1 * | 7/2024 | Arai | B65G 51/36 |
| 2024/0375887 | A1 * | 11/2024 | Boehmike | B65G 54/025 |
| 2025/0138078 | A1 * | 5/2025 | Loo | G01N 29/069 |
| 2025/0186875 | A1 * | 6/2025 | Matsushita | A63F 7/022 |

FOREIGN PATENT DOCUMENTS

| | | |
|---|---|---|
| JP | 3364712 B2 | 1/2003 |
| JP | 2018-075287 A | 5/2018 |
| JP | 2022-060767 A | 4/2022 |
| JP | 2022-78613 A | 5/2022 |

* cited by examiner

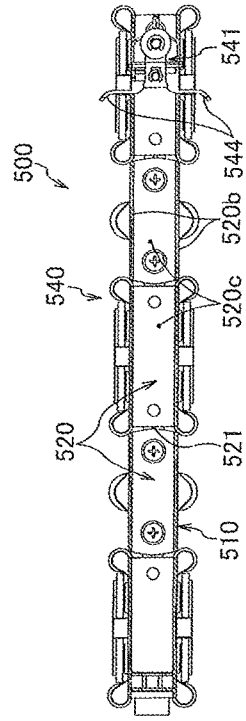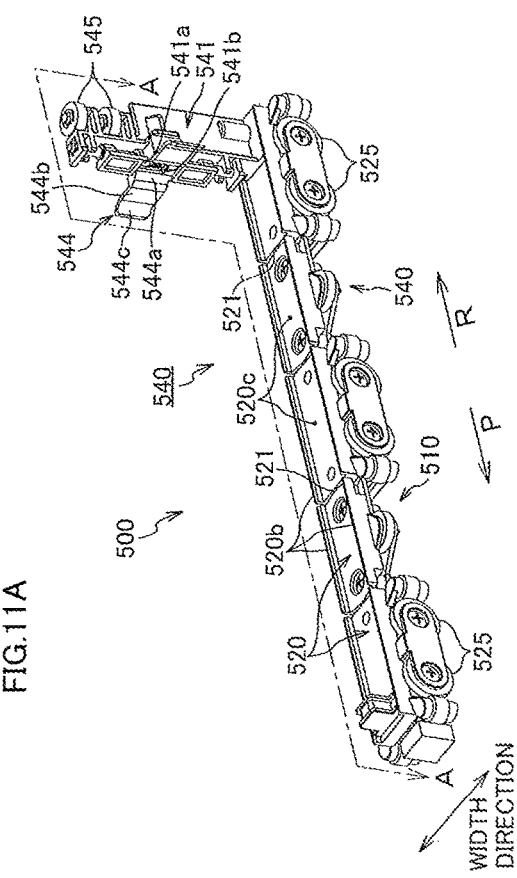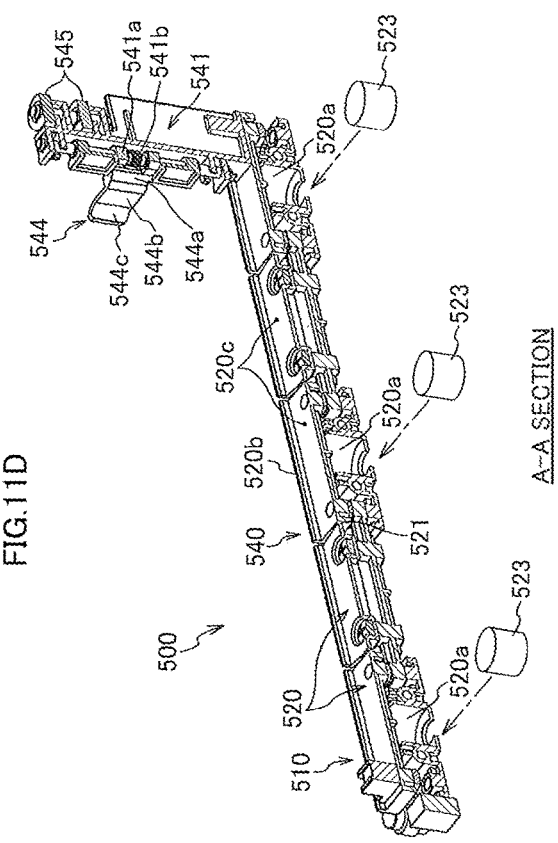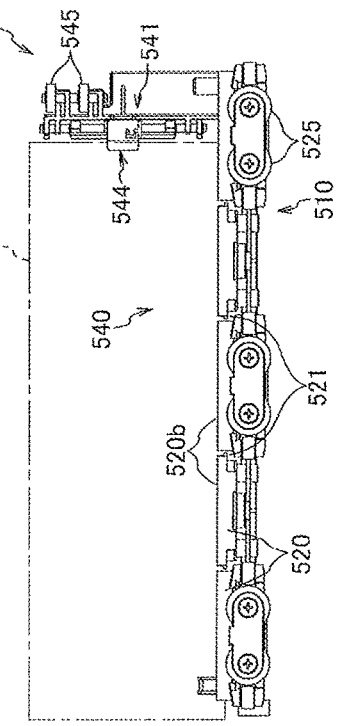

TRANSPORT SYSTEM

CROSS-REFERENCE TO RELATED APPLICATION

This application is based upon and claims the benefit of priority to Japanese Patent Application No. 2023-003269, filed on Jan. 12, 2023, with the Japanese Patent Office, the entire contents of which are incorporated herein by reference in its entirety.

FIELD

The present invention relates to a transport system.

BACKGROUND

There is known a technique to transport a transport target by using attraction or repulsion based on a magnetic force.

Japanese Patent Application Laid-Open No. 2018-75287 describes a transport device enabling a traveling body on which a transport target is placed to travel using attraction based on a magnetic force. The transport device includes first and second transport drive lines, each of which drives a belt body on which a first magnetic material is attached in a forward direction or a reverse direction, and a plurality of traveling bodies, each of which has a second magnetic material that attracts the first magnetic material on the first or second transport drive line, and is moved in the forward direction or the reverse direction by driving of the belt body.

This transport device has a configuration in which the belt bodies of the two transport drive lines extend in the same direction in parallel, and each of the traveling bodies is located across the two transport drive lines so as to travel along the same transport route. The traveling body that attracts the first magnetic material on the first transport drive line travels in a direction corresponding to the driving direction of the belt body of the first transport drive line. The traveling body that attracts the first magnetic material on the second transport drive line travels in a direction corresponding to the driving direction of the belt body on the second transport drive line. This enables the plurality of traveling bodies to travel in different directions within the same transport route.

Japanese Patent Application Laid-Open No. 2022-60767 discloses a transport device enabling a moving body to travel in an air blowing tube using an air flow and enabling a transport body to travel using a magnetic force in conjunction with movement of the moving body. Since no mechanical driving means such as a motor, a gear, and a transport belt are required to cause the moving body and the transport body to travel, the durability of members constituting the transport device can be increased and the running cost of the transport device can be reduced.

SUMMARY OF THE INVENTION

In Japanese Patent Application Laid-Open No. 2018-75287, the traveling states of the traveling bodies are controlled by the transport drive lines. Japanese Patent Application Laid-Open No. 2018-75287 does not disclose any means that controls travel of the traveling bodies other than the transport drive lines, and the traveling bodies driven by the same transport drive line cannot be individually controlled.

In Japanese Patent Application Laid-Open No. 2022-60767, the traveling state of the moving body and the transport body is controlled by an air flow. Japanese Patent Application Laid-Open No. 2022-60767 does not disclose any means that controls travel of the moving body and the transport body other than the air flow.

The present invention has been made in view of the circumstances described above, and it is an object of the present invention to provide a transport system that transports a transport target by using a magnetic force in which the transport target is transported with increased flexibility.

In order to solve the above problems, a transport system according to the present invention comprises: an air flow generating device; an air blowing tube that forms therein a flow path of an air flow generated by the air flow generating device; a moving body that travels inside the air blowing tube while receiving an air flow flowing within the air blowing tube; a transport body route that has at least a portion arranged along the air blowing tube to be adjacent to the air blowing tube; and a transport body that is configured to be able to retain a transport target and that travels inside the transport body route, where the moving body includes a moving body magnetic material, while the transport body includes a transport body magnetic material, and the transport system has a configuration to move the transport body in conjunction with movement of the moving body by using repulsion based on a magnetic force applied between the moving body magnetic material and the transport body magnetic material when there is a proximal positional relation between the moving body magnetic material and the transport body magnetic material, wherein the transport system comprises a control coil that controls a traveling state of the moving body, and drive control means driving and controlling the control coil, the control coil is configured to apply a magnetic force to the moving body magnetic material, and the drive control means supplies the control coil with power to cause the control coil to attract the moving body magnetic material against an air flow flowing within the air blowing tube in order to control and prevent the moving body from traveling.

According to the present invention, it is possible to transport a transport target with increased flexibility.

BRIEF DESCRIPTION OF DRAWINGS

FIGS. 11A, 11B, 11C, and 11D are an exterior perspective view, a front view, a plan view, and a sectional view along A-A in FIG. 11A of a transport body 500 in a state where collecting members (collecting pawls) are opened;

DESCRIPTION OF EMBODIMENTS

Figure 1:
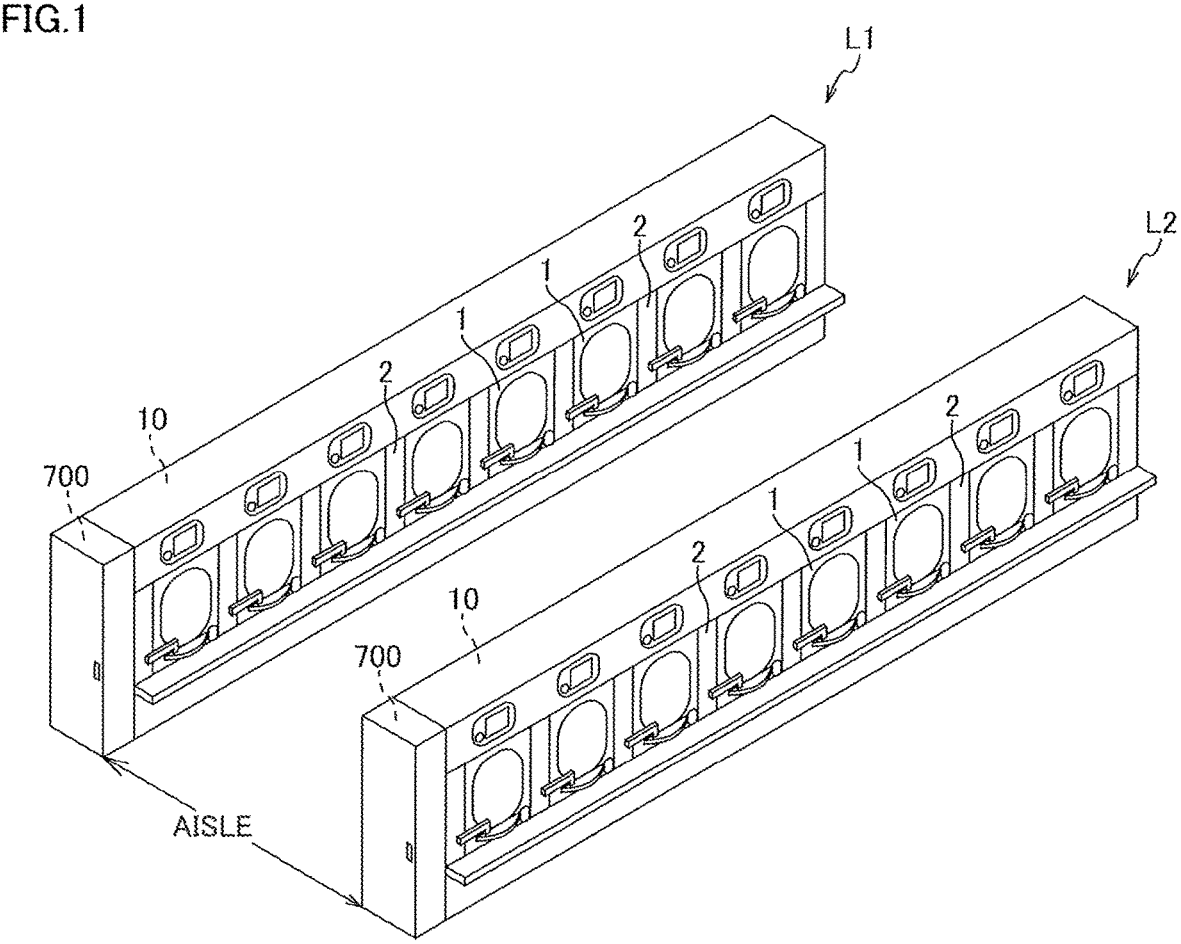
FIG. 1 is a perspective view illustrating a schematic configuration of game hall facilities including a plurality of game machines.

The present invention will be described below in detail with an embodiment illustrated in the drawings. Constituent elements, types, combinations, shapes, and relative arrangements described in the following embodiment are merely explanatory examples, and are not intended to limit the scope of the present invention solely thereto unless otherwise specified.

An embodiment of the present invention is described below in detail.

A. Paper Sheet Transport System According to First Invention

A basic configuration and an operation of a paper sheet transport system according to a first invention are explained below.

The paper sheet transport system is installed on each of game hall facilities in a game hall where various types of game machines such as pachinko machines or pachislot (pachinko-slot) machines are installed. Although banknotes are mainly explained as an example of paper sheets in the following embodiment, the present invention is also applicable to paper sheets (sheets) other than the banknotes, including securities such as cash vouchers or gift certificates, cards, and the like.

Although not particularly illustrated or explained, the paper sheet transport system according to the present invention is also applied to a banknote transport system or a banknote transport device in casinos.

[Schematic Configuration of Game Hall Facilities]

FIG. 1 is a perspective view illustrating a schematic configuration of game hall facilities including a plurality of game machines.

Game machines 1 are installed on game hall facilities L (L1, L2, . . . ) and eight game machines 1 are arranged back to back on each of two opposing side surfaces of each of the game hall facilities L, that is, a total of 16 game machines 1 are arranged back to back. An aisle on which players or clerks of the game hall walk is provided between the game hall facilities L and a chair (not illustrated) is provided for each of the game machines 1 on the aisles.

A sandwiched machine 2 is installed for each of the game machines 1 on the game hall facilities L. The sandwiched machine 2 includes a banknote inlet (a banknote input part) that receives input banknotes, a game media dispensing device that dispenses a number of pachinko balls corresponding to the money amount of input banknotes, and the like. A banknote transport system 10 that transports banknotes inserted through the sandwiched machines 2 to a cashbox unit 700 placed at one end portion of the associated game hall facility L is installed in each of the game hall facilities L illustrated in FIG. 1.

Figure 2:
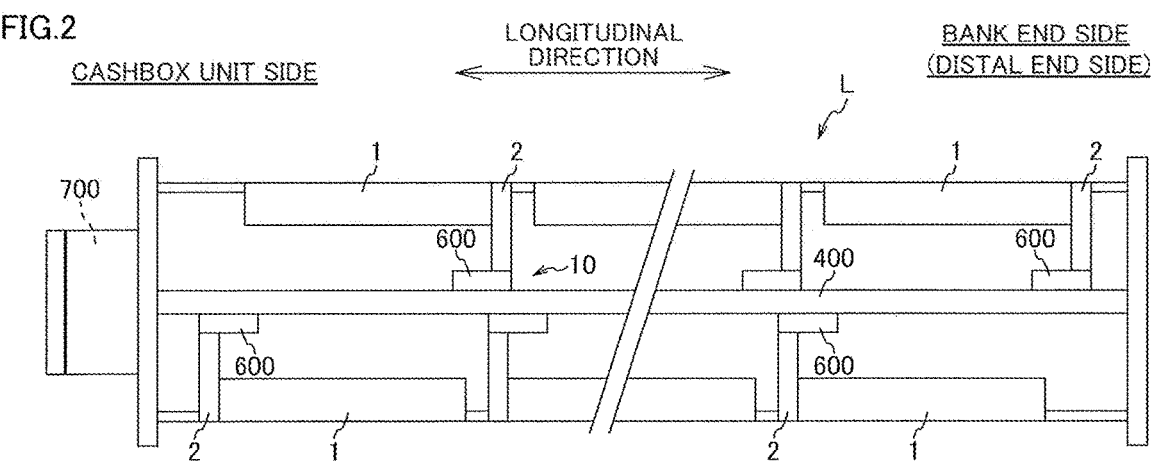
FIG. 2 is a plan view illustrating a schematic configuration of the game hall facility including a plurality of game machines.

FIG. 2 is a plan view illustrating a schematic configuration of the game hall facility including a plurality of the game machines.

The banknote transport system 10 installed in each of the game hall facilities L includes receiving units (banknote receiving devices) 600 that each receive banknotes inserted from the banknote inlet of the associated sandwiched machine 2 therein, a transport tube 400 that extends in a longitudinal direction of the game hall facility L (an array direction of the game machines 1) and that transports the banknotes received by the receiving units 600, the cashbox unit 700 that is arranged at one end of the transport tube 400, and the like.

[Schematic Configuration of Banknote Transport System]

<Overall Outline>

Figure 3:
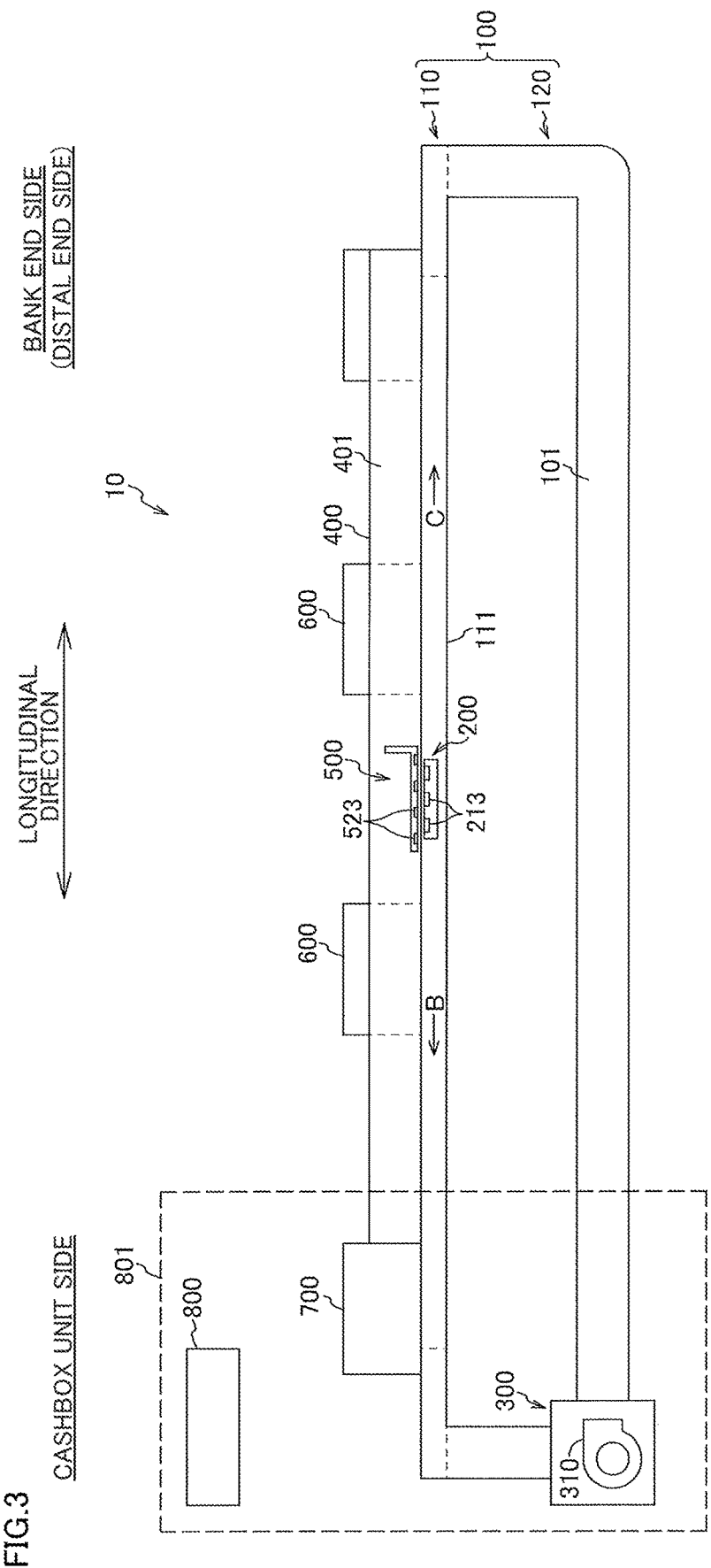
FIG. 3 is a schematic diagram illustrating a schematic configuration of a banknote transport system according to a first invention.

FIG. 3 is a schematic diagram illustrating a schematic configuration of the banknote transport system. The banknote transport system (paper sheet transport mechanism) 10 according to one embodiment of the first invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes (paper sheets) and that travels (moves) inside the transport tube 400. The transport tube 400 forms the transport path 401 (a banknote (paper sheet) transport route or a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet (a permanent magnet or an electromagnet).

The banknote transport system 10 includes the receiving units 600 that receive banknotes input from outside and keep the banknotes at predetermined locations in the transport tube 400, respectively, the cashbox unit 700 that includes a banknote accommodating part that accommodates therein banknotes transported by the transport body 500, and a management unit (control means) 800 that controls the components constituting the banknote transport system 10.

In the present example, the air-blow control unit 300 and the cashbox unit 700 are accommodated in a housing 801 that has the management unit 800 housed therein.

The banknote transport system 10 is characterized in moving the moving body 200 arranged in the air blowing tube 100 back and forth in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel to (side by side with) and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates (produces) an air flow in a predetermined direction inside the air blowing tube 100 and that can change the flow volume and the flow speed of the air flow. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives the banknotes kept at the predetermined locations in the transport path 401 to retain the banknotes in an upright state, and moves inside the transport path 401 to transport the banknotes to the cashbox unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit (a banknote receiving device) 600 receives banknotes inserted from the banknote inlet (a banknote inserting part) of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The cashbox unit 700 includes a banknote accommodating part that accommodates therein banknotes transported by the transport body 500, a drive mechanism that drives members related to accommodation of the banknotes in the banknote accommodating part, and the like.

The management unit (control means) 800 controls operations of the components constituting the banknote transport system 10. The management unit 800 is configured to include a general computer device that includes a CPU (Central Processing Unit), a ROM (Read Only Memory), a RAM (Random Access Memory), and the like and in which these units are connected via a bus. The CPU is an arithmetic unit that controls the entire banknote transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the first invention are explained.

<Air Blowing Tube>

The air blowing tube is explained with reference to FIGS. 3 and 4.

Figure 4:
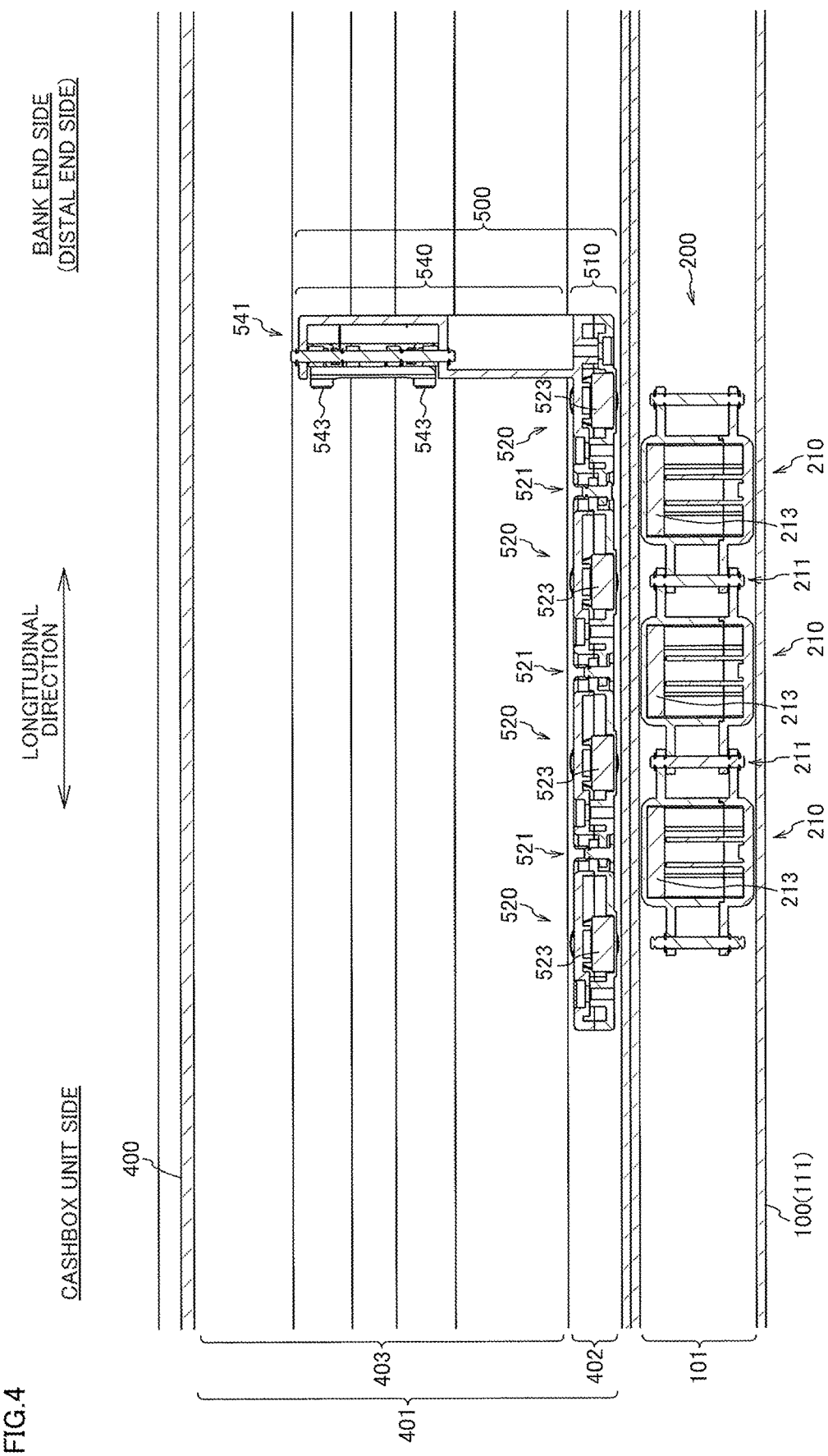
FIG. 4 is a vertical sectional view of a moving body, an air blowing tube including the moving body, a transport body, and a transport tube including the transport body in a case in which the moving body and the transport body repel each other due to a magnetic force.

FIG. 4 is a vertical sectional view of the moving body, the air blowing tube including the moving body, the transport body, and the transport tube including the transport body in a case in which the moving body and the transport body repel each other due to a magnetic force.

Figure 5:
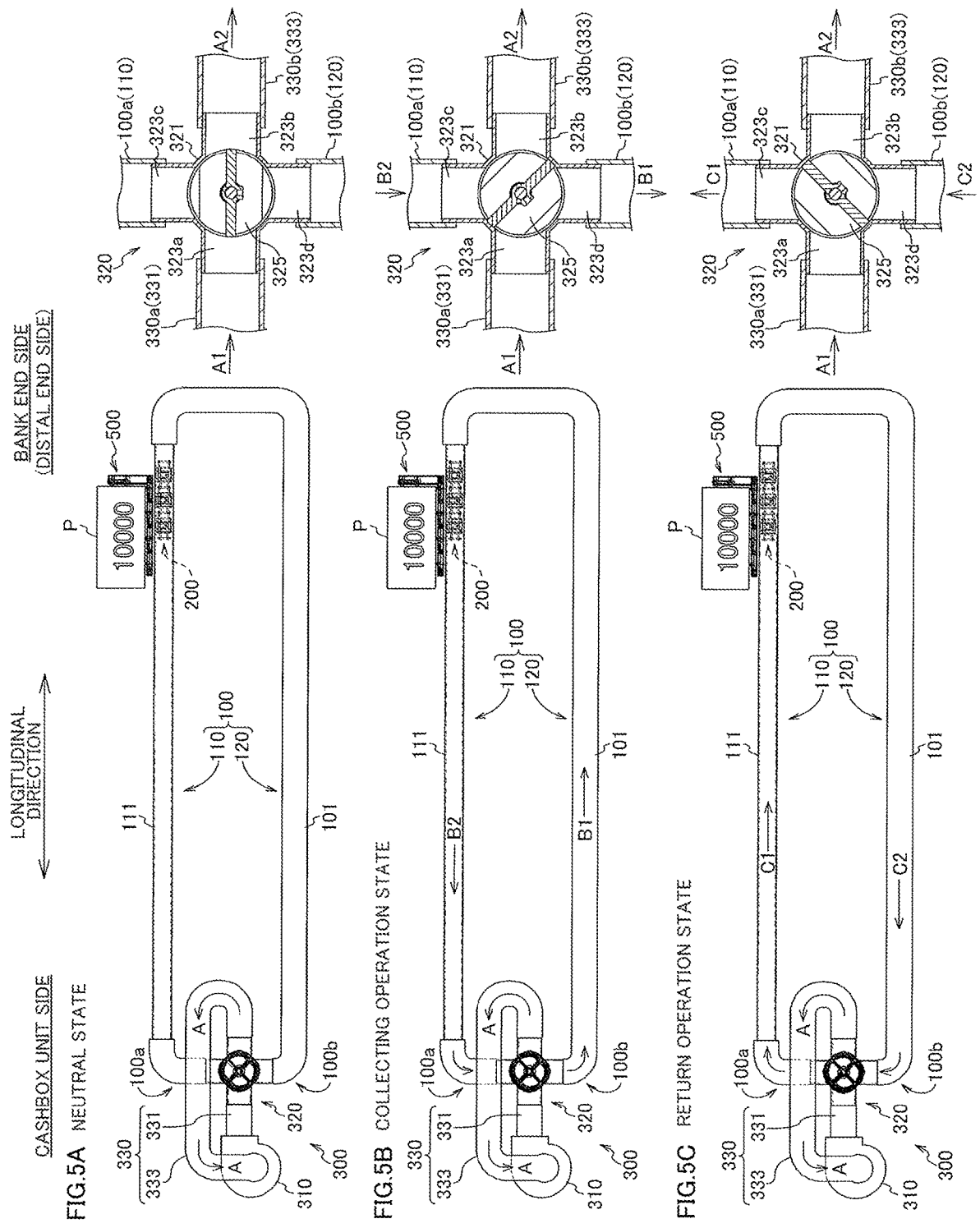
FIGS. 5A to 5C are schematic diagrams illustrating a relation between an air blowing tube and an air-blow control unit according to one embodiment of the first invention.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force.

While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape and a configuration that enable movement in the air blowing tube 100 by being subjected to an air pressure.

As illustrated in FIG. 4, the moving body 200 has a configuration in which a plurality of divided pieces 210, 210, . . . are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 while the divided pieces 210 displace even when the air blowing tube 100 forms the air flow path 101 curved in the upper-lower or right-left direction.

<Relation Between Air Blowing Tube and Moving Body>

The inner surface shape of the moving route part 111 and the outer surface shape (structure) of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

FIGS. 5A to 5C are schematic diagrams illustrating a relation between the air blowing tube and the air-blow control unit according to one embodiment of the first invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air-flow control device) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323a to a fourth flow path 323d: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 800 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 800 executes feedback control of the rotation angle of the switching valve 325 may be adopted.

The first circulation pipe 330 includes the air discharge tube 331 that has one end portion (one end portion 330a of the first circulation pipe 330) communicatively connected to the first flow path 323a of the switching unit 320 and the other end portion communicatively connected to the outlet of the blower 310, and the air intake tube 333 that has one end portion communicatively connected to the inlet of the blower 310 and the other end portion (the other end portion 330b of the first circulation pipe 330) communicatively connected to the second flow path 323b of the switching unit 320.

The air blowing tube (second circulation pipe) 100 has one end portion 100a communicatively connected to the third flow path 323c of the switching unit 320 and the other end portion 100b communicatively connected to the fourth flow path 323d of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323c and the second air blowing tube 120 is communicatively connected to the fourth flow path 323d.

<<Operation of Switching Unit: Neutral State>>

FIG. 5A illustrates a neutral state.

The switching valve 325 is in a neutral position for establishing communication between the first flow path 323a and the second flow path 323b while not establishing communication between the first and second flow paths 323a and 323b and the third and fourth flow paths 323c and 323d.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5B illustrates a first state in which an air flow flowing in the first direction (an arrow-B1 or B2 direction) is generated inside the air blowing tube 100. This state is, for example, a banknote collecting operation state for transporting banknotes collected by the transport body 500 to the cashbox unit 700.

The switching valve 325 is in a first communication position for establishing communication between the first flow path 323a and the fourth flow path 323d and establishing communication between the second flow path 323b and the third flow path 323c. At this time, the first flow path 323a and the fourth flow path 323d are not communicated with the second flow path 323b and the third flow path 323c.

The air circulates in an endless manner between the first circulation pipe 330 and the air blowing tube 100. That is, air (in the arrow-A1 direction) discharged from the discharge tube 331 to flow in the first flow path 323a flows in the second air blowing tube 120 from the fourth flow path 323d (in the arrow-B1 direction) due to the switching valve 325. Air flowing in the arrow-B2 direction inside the first air blowing tube 110 to flow in the third flow path 323c flows in the intake tube 333 from the second flow path 323b (in the arrow-A2 direction) due to the switching valve 325, returns to the blower 310, and is discharged again from the discharge tube 331.

<<Operation of Switching Unit: Second Communication State>>

FIG. 5C illustrates a second state in which an air flow flowing in the second direction (an arrow-C1 or C2 direction) is generated inside the air blowing tube 100. This state is, for example, a return operation state for returning the transport body 500 from the side of the cashbox unit 700 (the side of the management unit 800) to the distal end side of the transport tube 400.

The switching valve 325 is in a second communication position for establishing communication between the first flow path 323a and the third flow path 323c and establishing communication between the second flow path 323b and the fourth flow path 323d. At this time, the first flow path 323a and the third flow path 323c are not communicated with the second flow path 323b and the fourth flow path 323d.

The air circulates in an endless manner between the first circulation pipe 330 and the air blowing tube 100. That is, air (in the arrow-A1 direction) discharged from the discharge tube 331 to flow in the first flow path 323a flows in the first air blowing tube 110 from the third flow path 323c (the arrow-C1 direction) due to the switching valve 325. Air flowing in the arrow-C2 direction inside the second air blowing tube 120 to flow in the fourth flow path 323d flows in the intake tube 333 from the second flow path 323b (in the arrow-A2 direction) due to the switching valve 325, returns to the blower 310, and is discharged again from the discharge tube 331.

<<Operation of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be changed by changing the position of the switching valve 325 while an air flow in a certain direction (the arrow-A direction) is generated by the single blower 310.

In intermediate positions taken by the switching valve 325 among the three positions described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control. However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<Transport Tube>

The transport tube (the transport route) 400 is explained with reference to FIGS. 4 and 6.

Figure 6:
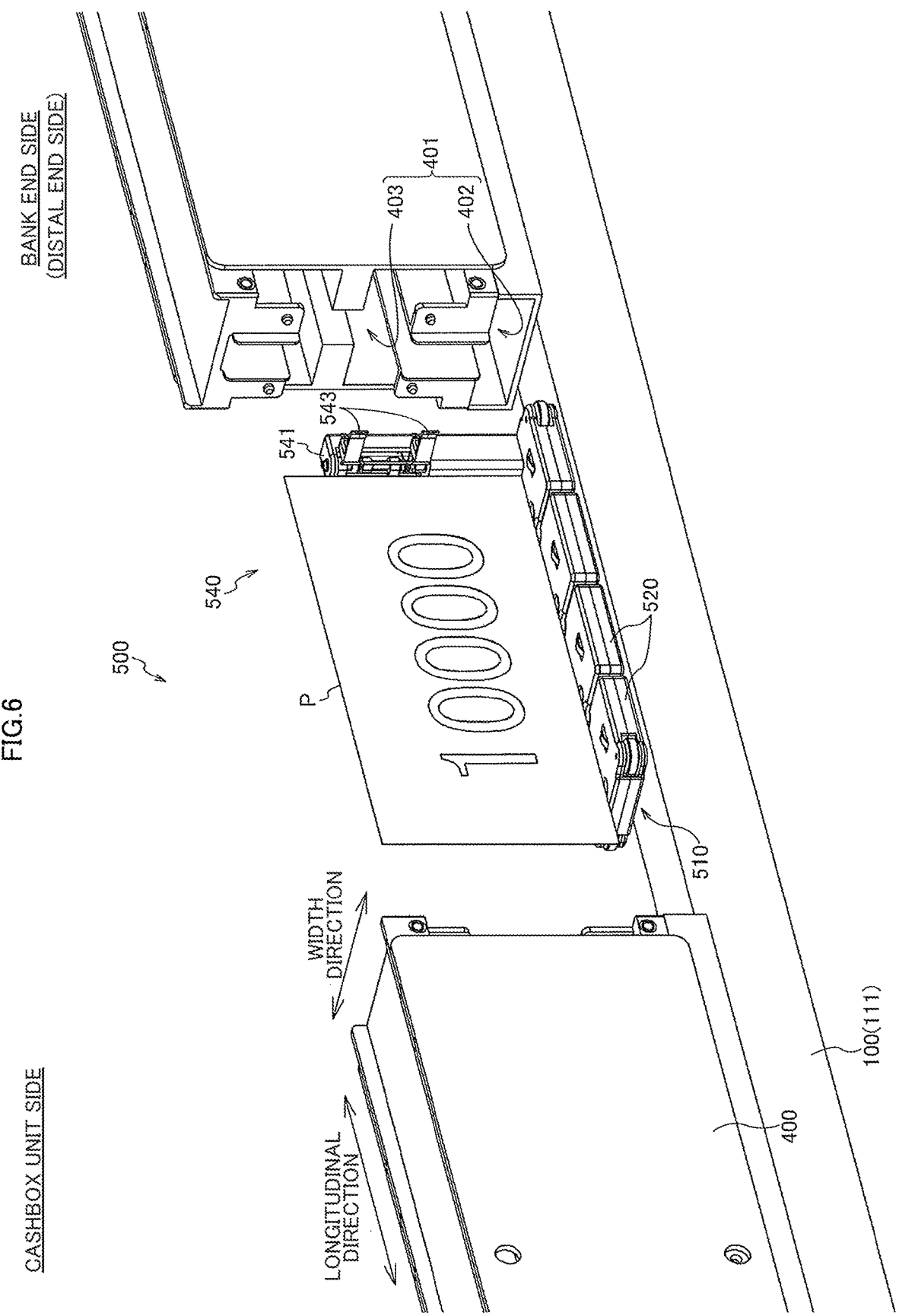
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof without affecting the travel of the transport body 500.

The transport tube 400 includes a configuration (the thickness of the tube, the spacing between tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means that constitutes the transport path 401 in the present example, the means that constitutes the transport path 401 does not need to be tubular and the present invention can be achieved even with a configuration in which a part or the whole of the transport path 401 is open to outside. That is, the transport tube 400 can have any form when it can form an elongated space as the transport path 401 therein.

<Transport Body>

As illustrated in FIGS. 4 and 6, the transport body 500 includes a transport base 510 that is arranged on the side nearer the air blowing tube 100 in the transport path 401 and that is subjected to a magnetic force from the moving body 200, and a banknote collecting/retaining part 540 provided on the opposite side of the transport base 510 to the air blowing tube 100.

<<Transport Base>>

The transport base 510 has a configuration in which a plurality of divided pieces 520, 520, . . . are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole) faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper centering on the hinge parts 521, respectively. With the configuration described above, the transport body 500 can smoothly move in the transport tube 400 even when the transport tube 400 forms the transport path 401 curved in the upper-lower or right-left direction.

<<Banknote Collecting/Retaining Part>>

The banknote collecting/retaining part 540 is arranged on the transport base 510. The banknote collecting/retaining part 540 includes a support member 541 that is upright in a direction away from the air blowing tube 100, and collecting members (collecting pawls) 544 that are protruded from the support member 541 in the width direction at an end portion on the bank end side in the longitudinal direction of the transport tube 400 (on the distal end side with respect to the cashbox unit 700). The support member 541 is protruded upward from a middle portion of the transport base 510 in the width direction.

The banknote collecting/retaining part 540 retains banknotes (paper sheets) P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the collecting pawls 544.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a horizontally-long space where the transport base 510 of the transport body 500 travels, and the banknote transport path 403 is a vertically-long space where the banknote collecting/retaining part 540 of the transport body 500 and banknotes retained by the banknote collecting/retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and to maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the moving body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Accordingly, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
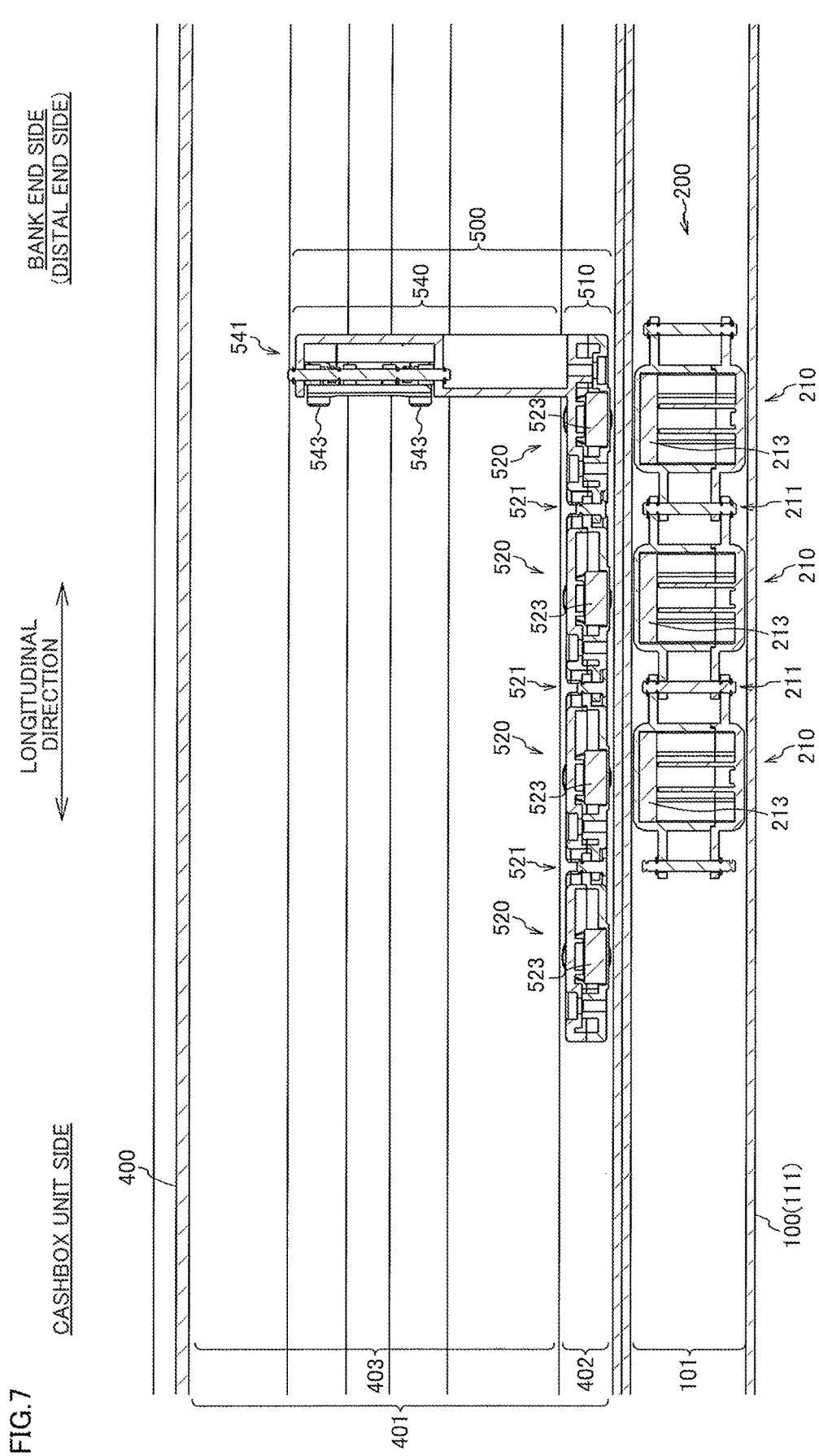
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match each other with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the cashbox unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
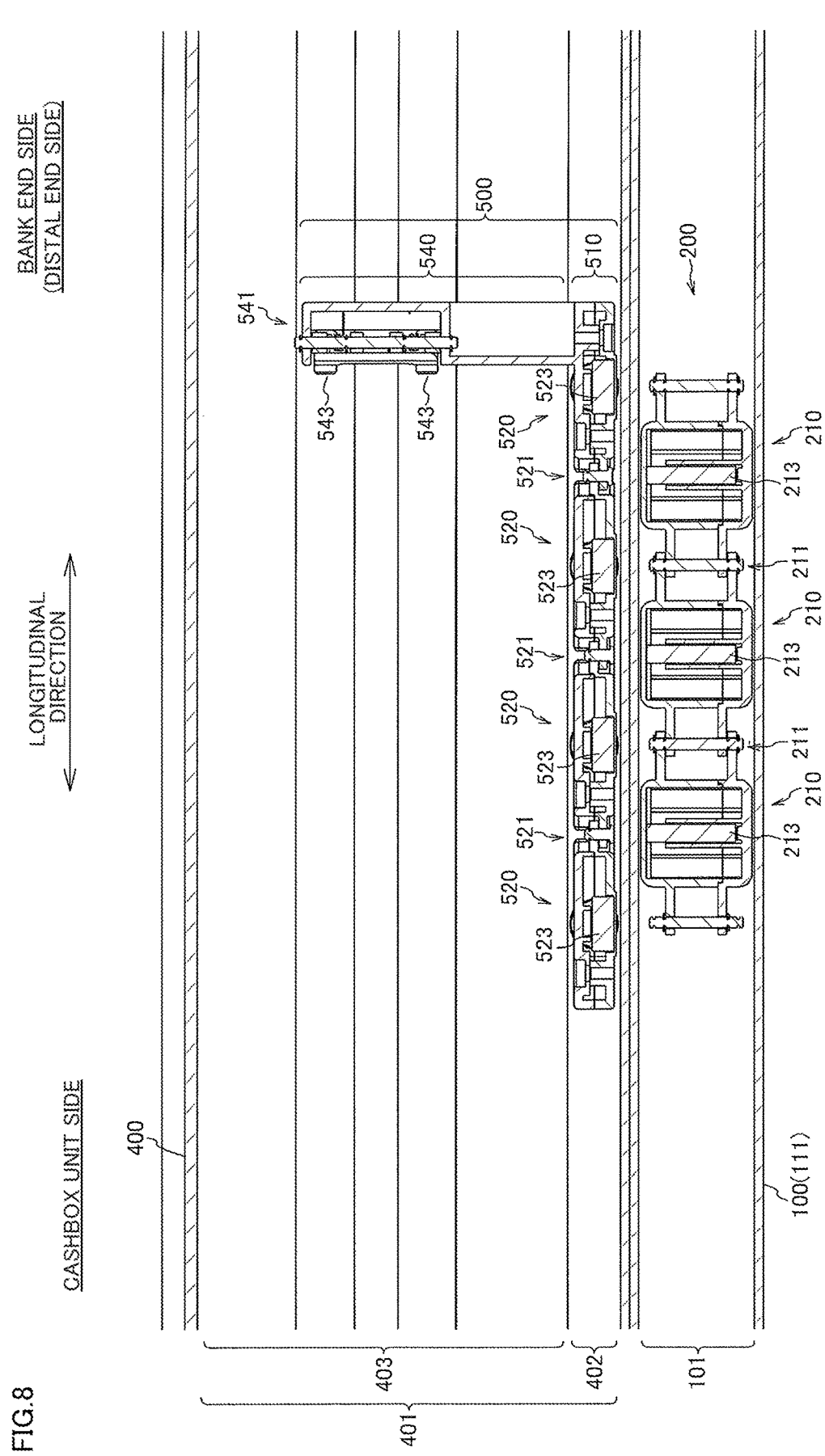
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the cashbox unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8.

Since surfaces (the N poles) on the cashbox unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

First Modified Embodiment Related to Air Blow Control

Figure 9:
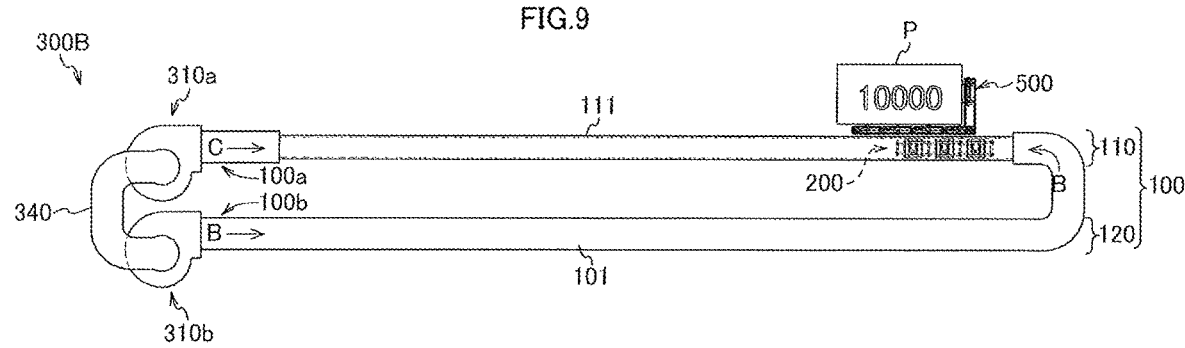
FIG. 9 is a diagram illustrating a first modification of the air-blow control unit.

FIG. 9 is a diagram illustrating a first modification of the air-blow control unit.

An air-blow control unit 300B may have a configuration including a blower 310a having an outlet connected to one end portion 100a of the air blowing tube 100, a blower 310b having an outlet connected to the other end portion 100b of the air blowing tube 100, and a connection pipe 340 that connects inlets of the blowers 310*a* and 310*b* to each other. The air blowing tube 100 (the first air blowing tube 110 and the second air blowing tube 120) is configured in an endless manner through the two blowers 310*a* and 310*b* and the connection pipe 340.

Turning on/off of the blowers 310*a* and 310*b* and the air volume thereof are controlled by the management unit 800.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off. Air flowing inside the air blowing tube 100 flows in the outlet of the blower 310*a* and is discharged from the inlet of the blower 310*a*. The air further passes through the connection pipe 340 to return to the inlet of the blower 310*b* and is discharged from the outlet of the blower 310*b*.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

In this manner, the use of two blowers also enables the air flow in the first direction and the air flow in the second direction to be generated inside the air blowing tube 100.

Since the inlets of the two blowers 310*a* and 310*b* are connected with the connection pipe 340 in the present example, air can be efficiently circulated inside the air flow path 101 airtightly configured.

Second Modified Embodiment Related to Air Blow Control

Figure 10:
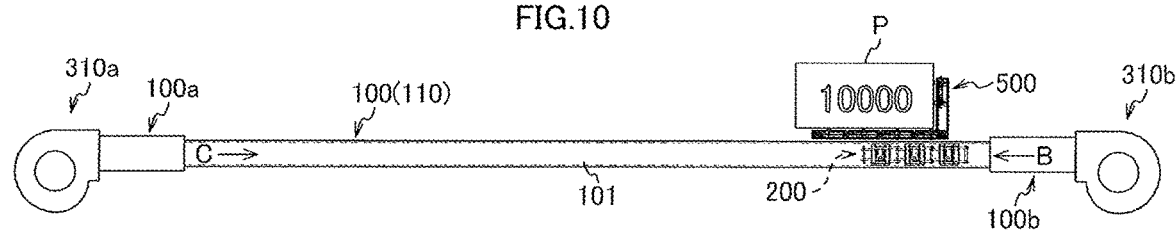
FIG. 10 is a diagram illustrating a second modification of the air-blow control unit.

FIG. 10 is a diagram illustrating a second modification of the air-blow control unit.

An air-blow control unit 300C may have a configuration including the blowers 310*a* and 310*b* at one end portion 100*a* and the other end portion 100*b* of the air blowing tube 100, respectively. Turning-on/off of the blowers 310*a* and 310*b* and the air volume thereof are controlled by the management unit 800.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off. The blower 310*b* takes external air to the inside from the inlet and discharges the air, thereby generating the air flow in the arrow-B direction inside the air blowing tube 100. This air flow is taken into the blower 310*a* from the outlet of the blower 310*a* and is discharged from the inlet.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

Since the present example does not require pipes for causing the air flow path 101 to be a circulation path, the configuration is simplified.

B. Paper Sheet Transport System According to Second Invention

<<Transport Body (Banknote Collecting Shuttle)>>

Figure 12A:
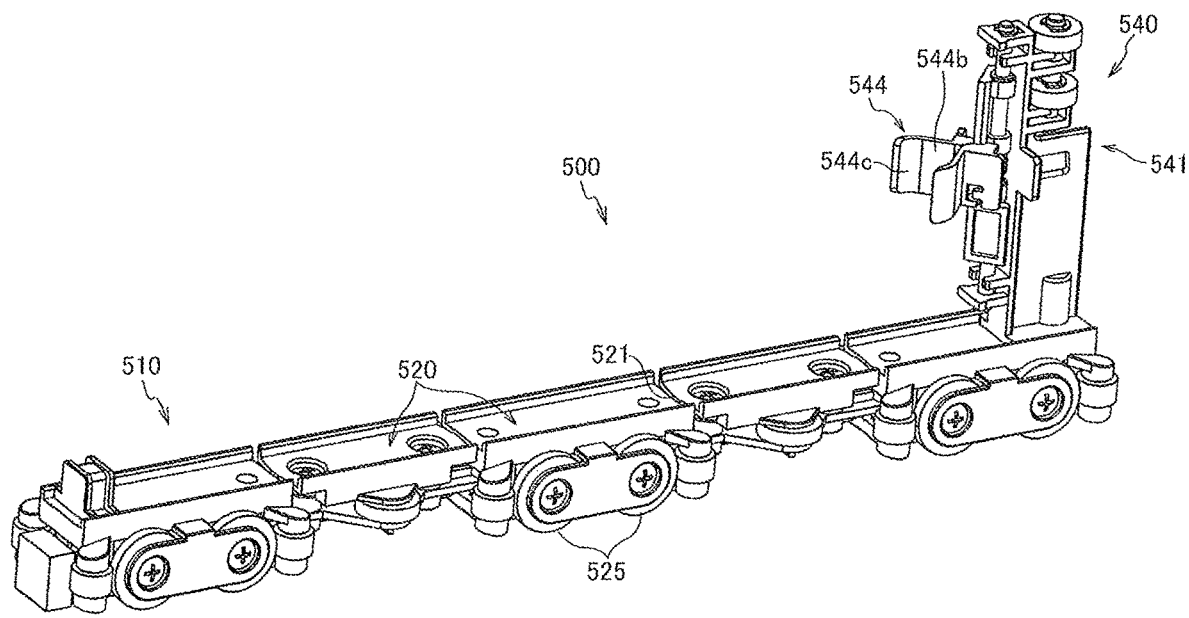
FIGS. 12A and 12B are an exterior perspective view and a plan view of the transport body 500 in a state where the collecting members (the collecting pawls) are closed.
Figure 12B:
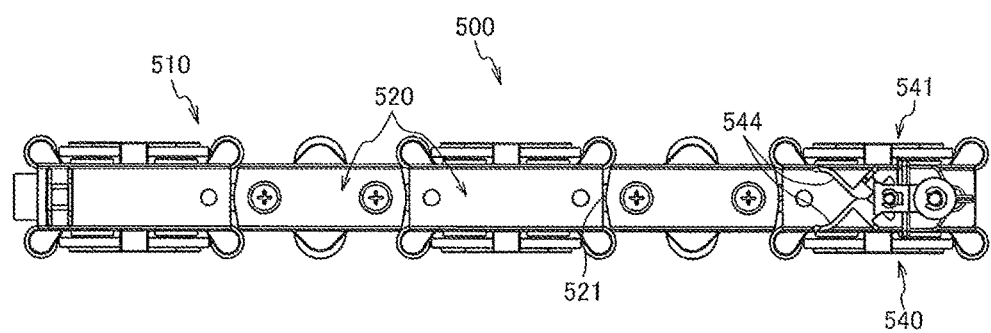
Figure 13:
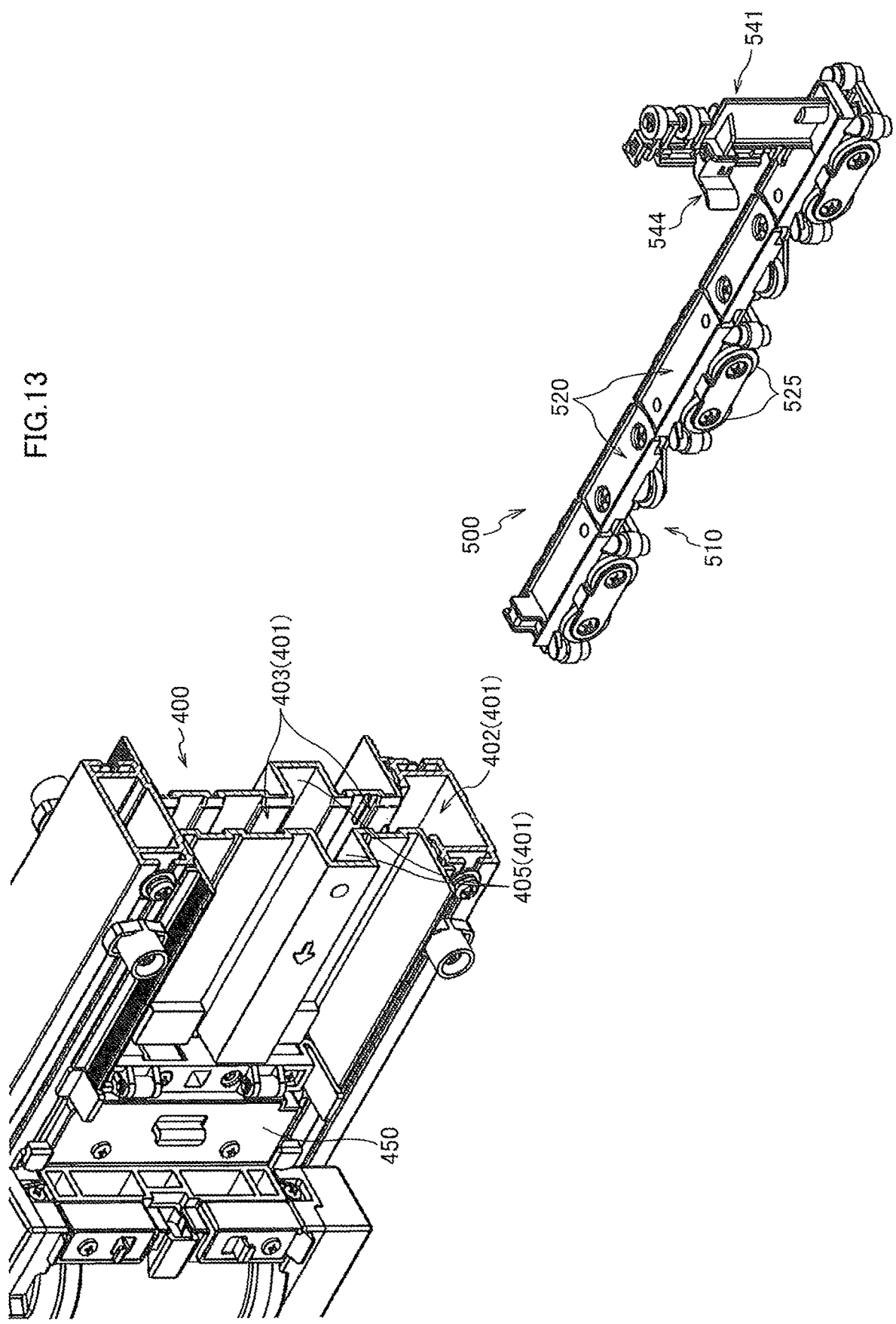
FIG. 13 is a partial sectional view illustrating a location relation between a transport tube 400 and the transport body 500.

FIGS. 11A, 11B, 11C, and 11D are an exterior perspective view, a front view, a plan view, and a sectional view along A-A in FIG. 11A of the transport body 500 in a state where the collecting members (the collecting pawls) are opened. FIGS. 12A and 12B are an exterior perspective view and a plan view of the transport body 500 in a state where the collecting members (the collecting pawls) are closed. FIG. 13 is a partial sectional view illustrating a location relation between the transport tube 400 and the transport body 500.

The transport body 500 illustrated in FIGS. 11 to 13 is slightly different from the transport body illustrated in FIG. 6 in the configurations of the transport base 510 and the collecting members 544.

That is, the transport base 510 has a configuration in which the divided pieces 520 are coupled to each other with the hinge parts 521 to be displaceable in the upper-lower or right-left direction (or also in oblique directions) and the transport body magnet (transport body magnetic material) 523 is arranged in an internal space 520*a* of each of the divided pieces illustrated in FIG. 11D. Rotatable rollers 525 are also arranged on both side surfaces of each of the divided pieces 520 to enable smooth movement inside the transport tube 400. Rollers 545 are rotatably arranged on an upper portion of the support member 541 to reduce resistance with the inner wall of the transport tube.

The banknote collecting/retaining part (transfer means) 540 retains banknotes P to cause the long edge direction of the banknotes P to be in parallel to the longitudinal direction of the transport tube 400 and in an upright attitude. A long side on the lower side of the banknote P horizontally long and in the upright attitude is supported by the upper surface (the flat surface) of the transport base 510 (the divided pieces 520). The rear end edge (one of short sides) of the banknote is supported by the support member 541 and the collecting members 544.

While protrusions 520*b* preventing dropping of banknotes are provided on each of the divided pieces 520 on both end edges in the width direction, respectively, a region 520*c* on the inner side of the protrusions 520*b* is a flat surface and can stably support the long side on the lower side of each banknote. Since the regions 520*c* on the inner sides of the divided pieces 520 are communicated with each other in the longitudinal direction, banknotes can be placed across the inner regions 520*c* of plural divided pieces.

The banknote collecting/retaining part 540 erected on the transport base 510 includes, at an end portion of the transport tube 400 on the bank end side in the longitudinal direction (on the distal end side with respect to the cashbox unit 700), the support member 541 that is upright in a direction away from the air blowing tube 100, and the collecting members 544 including the two collecting pawls 544 that are protruded (spread) in the width direction from the support member 541 in a wing-like manner (at an acute angle or an obtuse angle) in plan view and that are pivotally supported by a pivotally support part 541*a* on the side of the support member 541 to be openable/closable in the horizontal direction. Since the illustrated pivotally support part 541*a* is in parallel to the support member 541, that is, in a vertical attitude, the collecting pawls 544 rotationally moving on the pivotally support part open and close in the horizontal direction. The rotational movement direction of the collecting pawls may be other directions.

Unlike the configuration example of FIG. 6 in which upper and lower two pairs of the collecting members are arranged, a pair of the collecting members 544 is arranged at a predetermined height location of the support member 541. The two collecting pawls 544 constituting the collecting members 544 are at the maximum open angle in the spread state illustrated in FIG. 11 and cannot rotationally move any more in the opening direction while they can rotationally move in the closing direction from the spread state. FIG. 12 illustrate a state (closed state) in which the two collecting pawls 544 are at the minimum open angle. Each of the collecting pawls 544 is always elastically biased in the opening direction by a spring (elastic member) 541b provided on the pivotally support part 541a. When the transport body 500 moves on the transport path 401 in the forward direction P toward the cashbox unit 700, each of the collecting pawls 544 maintains the spread position due to the spring 541b and the collecting pawls can therefore catch the rear end edge of a banknote stopping in the upright state in a predetermined keeping part 450 (FIG. 13) in which banknotes are retained to transfer the banknote onto the transport base 510 while moving the banknote in the forward direction P in the keeping part. Concave portions 405 (FIG. 13) serving as collecting pawl passages are formed at places that are both inner walls of the transport tube 400 and that are passed by the collecting pawls to enable the collecting pawls to maintain the spread position in the process of movement of the transport base 510 in the transport path 401 in the forward direction P toward the cashbox unit 700, respectively. The concave portions 405 in each of the keeping parts 450 are laid out to enable the associated collecting pawls to be brought into contact with the rear end edge of a banknote in the keeping part. It is preferable that the collecting pawls 544 are configured to independently perform the opening/closing operation. In such a case, each of the collecting pawls may be constituted to be individually rotationally moved by one coil spring (or a torsion spring), or the spring 541b may be provided for each of the collecting pawls.

Each of the collecting pawls 544 in the spread state illustrated in FIG. 11 includes a base end piece 544a on the inner side, which is pivotally supported by the pivotally support part 541a to be rotationally movable, an intermediate piece 544b extending outward in the width direction of the transport body from the base end piece 544a, and an end portion piece 544c bent or curved to be protruded in a diagonally forward direction from the intermediate piece 544b. When the collecting pawl 544 passes through in a keeping part 450, the intermediate piece 544b and the end portion piece 544c mainly enter the keeping part 450 and push the whole banknote in the forward direction while being in contact with the rear end edge of the kept banknote. If the banknote rear end edge being in contact with the intermediate piece 544b is about to be deviated outward in the width direction along a face of the intermediate piece, the end portion piece 544c can reliably block the deviation because the end portion piece 544c is protruded obliquely from an end portion of the intermediate piece 544b. After the kept banknote is transferred onto the transport base 510, the end portion piece 544c prevents the loaded banknotes from being deviated in the width direction or dropping.

With the configuration of the intermediate piece 544b to have an attitude parallel to the width direction of the transport path 401 or oblique to the forward direction P in the spread position of the collecting pawls 544 as illustrated in FIGS. 11, the intermediate piece can reliably catch and press the banknote rear end edge in the forward direction when brought into contact with the rear end edge in each of the keeping parts.

As described above, the collecting members 544 include a pair of the collecting pawls pivotally supported by the support member to be openable and closable in a substantially horizontal direction, and each of the collecting pawls opens and closes between the spread position protruded outward in the width direction and the retracted position retracted inward in the width direction and is biased toward the spread position by the elastic member.

Since each of the collecting pawls 544 has the configuration described above, merely linearly moving the transport body at the time of collecting banknotes in the keeping parts that are alternately positioned at different locations in the longitudinal direction across the transport path 401 enables the banknotes to be reliably collected by the associated collecting pawl and to be accumulated in a central portion of the transport body in the width direction.

When the transport body 500 moves in the retraction direction R in the transport path, the collecting pawls interfere with banknotes in the keeping parts. However, the collecting pawls switch the direction in the closing direction against the biasing of the elastic member in the process of continuing to move in contact with the banknotes. Accordingly, the transport body 500 can smoothly continue to move in the returning direction without providing impact such as damages on the kept banknotes.

Since the method of sequentially loading a collected following banknote with one face of the following banknote stacked on one face (one side surface) of already loaded banknotes in a state where the banknotes are already loaded on the transport base 510 in the upright state is adopted, the front end edge of the following banknote does not hit the rear end edge of the already loaded banknotes to become unloadable.

C. Transport System According to Third Invention

First Embodiment

Figure 14:
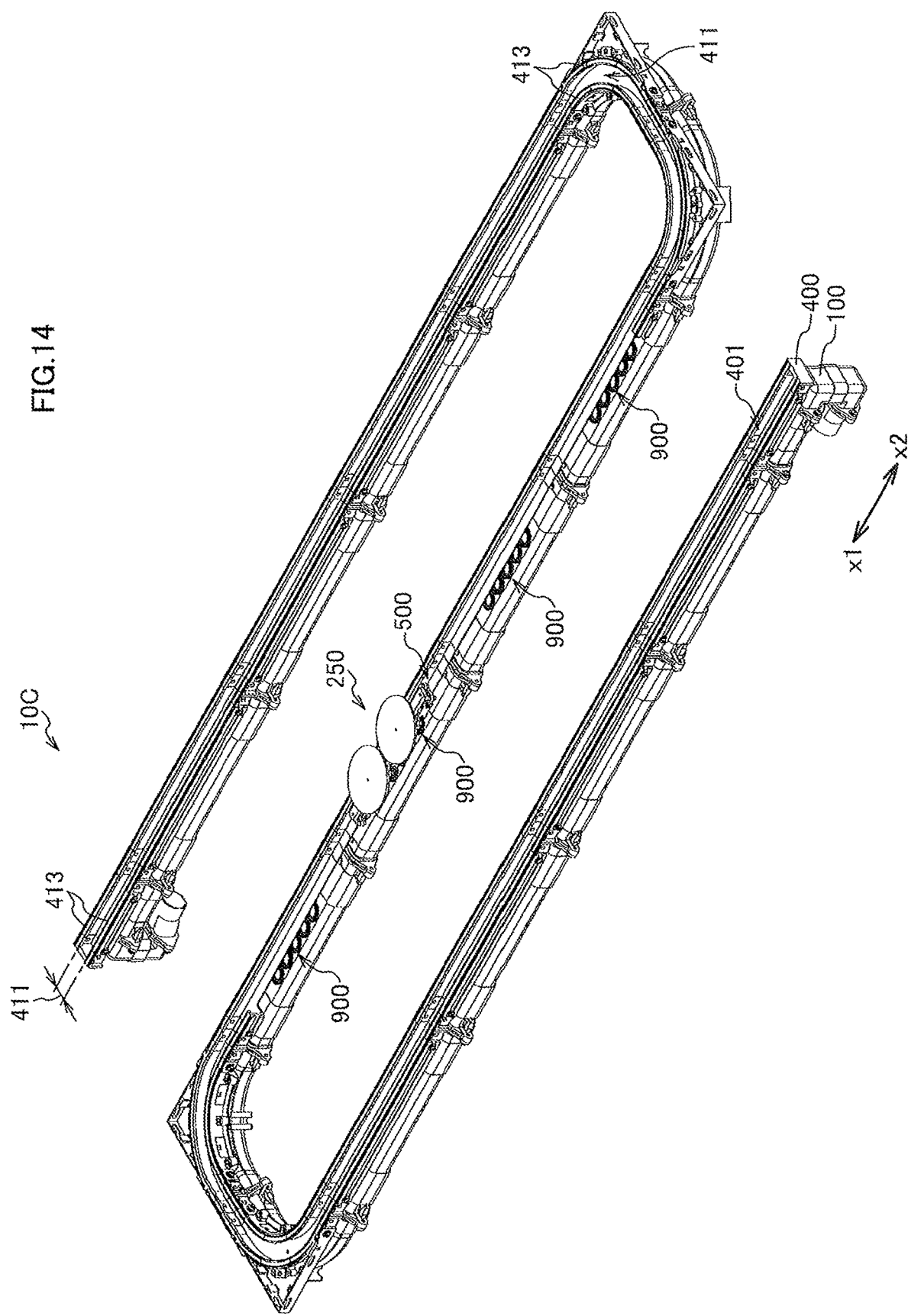
FIG. 14 is a perspective view illustrating a schematic configuration of a transport system according to one embodiment of a third invention.
Figure 15:
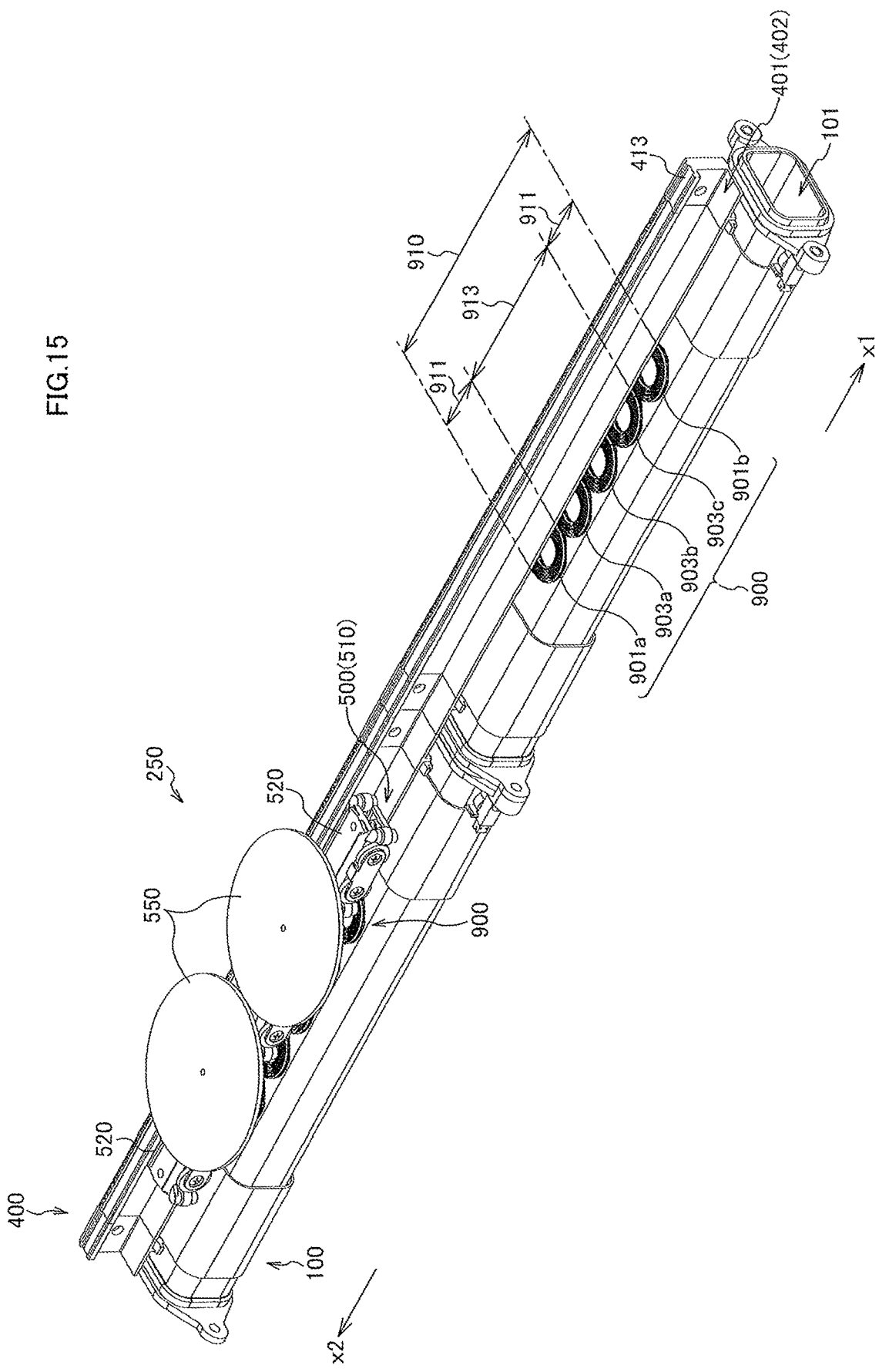
FIG. 15 is a partially enlarged perspective view illustrating a schematic configuration of the transport system.

FIG. 14 is a perspective view illustrating a schematic configuration of a transport system according to one embodiment of the third invention. FIG. 15 is a partially enlarged perspective view illustrating a schematic configuration of the transport system. In FIGS. 14 and 15, a portion of the transport body route is illustrated in cross section by cutting and removing a portion of the transport body route in the width direction.

<Schematic Configuration>

A transport system 10C (the transport device) according to one embodiment of the present invention includes the blower 310 (the air flow generating device: FIG. 3), the air blowing tube 100 that forms therein a flow path of an air flow generated by the blower 310, the switching unit 320 (FIG. 5) that controls and switches between directions of the air flow in the air blowing tube 100, the management unit (air flow control means) 800 that controls the blower 310 and the switching unit 320, the moving body 200 that travels inside the air blowing tube 100 while receiving an air flow flowing within the air blowing tube, the transport path (the transport body route) 401 that has at least a portion arranged along the air blowing tube 100 to be adjacent to the air blowing tube, and the transport body 500 that is configured to be able to retain a transport target and that travels inside the transport path.

The moving body 200 includes the moving body magnets (the moving body magnetic material) 213, while the transport body 500 includes the transport body magnet (the transport body magnetic material) 523. The transport system 10C has a configuration to move the transport body 500 in conjunction with movement of the moving body 200 by using repulsion based on a magnetic force applied between the moving body magnets 213 and the transport body magnet 523 when there is a proximal positional relation between the moving body magnets and the transport body magnet.

Figure 18:
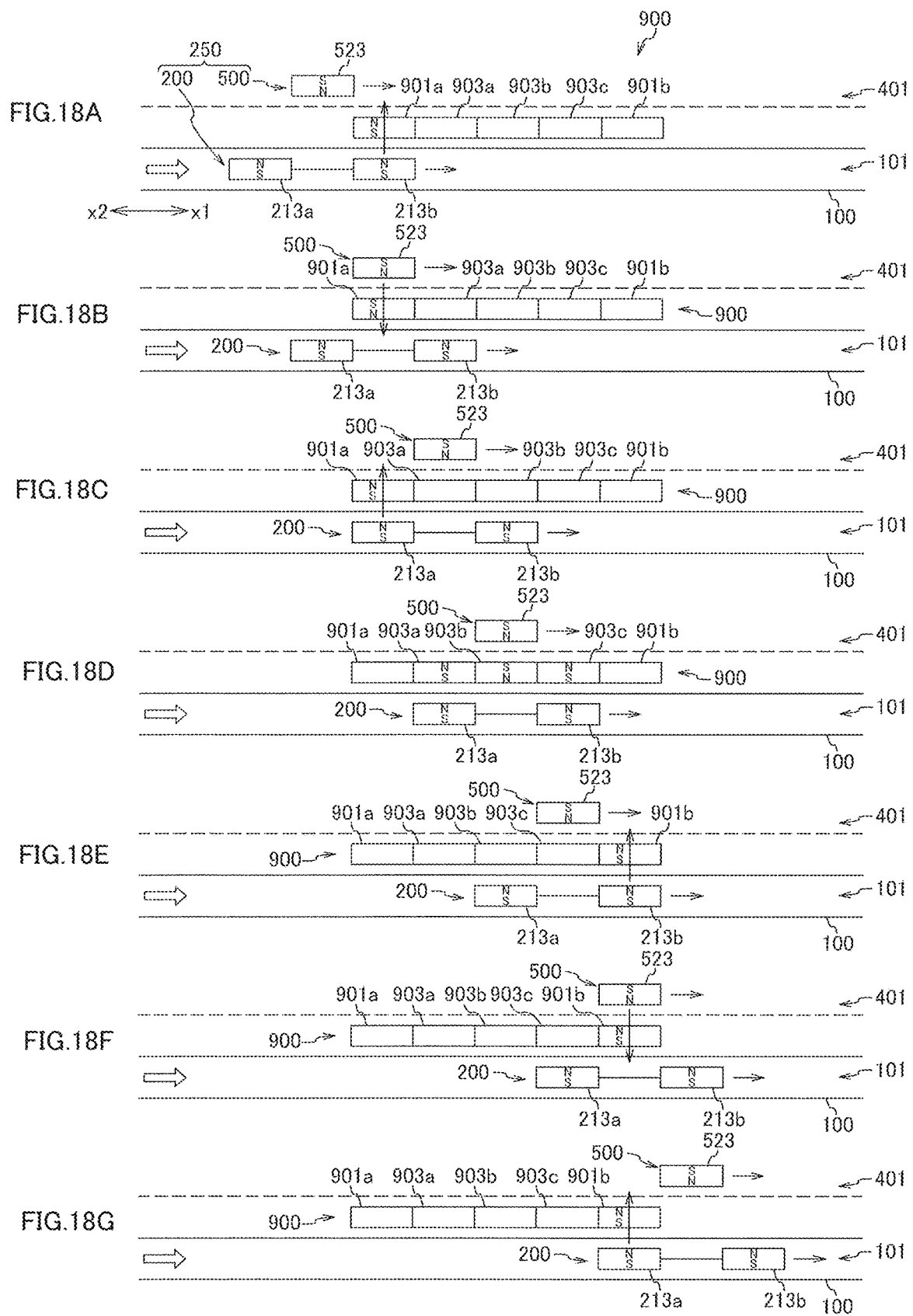
FIGS. 18A to 18G are schematic diagrams for explaining detection of, and travel blocking control for, the moving body and the transport body.

In the transport system 10C, one moving body 200 and one transport body 500 traveling in conjunction with the moving body constitute a conjunct traveling pair 250 (see FIG. 18).

The transport system 10C includes a travel control unit 900 located between the air blowing tube 100 and the transport path 401. The travel control unit 900 is means that blocks (stops) the moving body 200 and the transport body 500 from traveling.

<Transport Body and Transport Path>

The transport body 500 and the transport tube 400 illustrated in FIG. 15 (and FIG. 14) are different from those illustrated in FIGS. 11 to 13.

The support member 541, the collecting pawls 544, and the rollers 545 in the transport body 500 that are illustrated in FIGS. 11 to 13 are omitted from the transport body 500 illustrated in FIG. 15. As illustrated in FIG. 15, transport tables 550 and 550 on which a transport target is placed (or supported) are attached to the upper surface of some of the divided pieces 520 and 520 of the transport body 500 by an appropriate method.

The transport path 401 illustrated in FIG. 15 includes only the base transport path 402 illustrated in FIG. 13, and is open on the upper side of the transport path 401. That is, the transport tube 400 has a semi-tubular shape. An upper-side opening 411 provided on the transport path 401 is an opening extending along the longitudinal direction (travel direction that is x1 and x2 directions). From each end portion of the upper-side opening 411 in the width direction, an elongated convex protrusion 413 is provided protruding toward the other end portion (FIG. 15 only illustrates one of the elongated convex protrusions 413). The elongated convex protrusions 413 extend along the longitudinal direction. The length of the upper-side opening 411 in the width direction is set smaller than the length of the transport base 510 in the width direction, so that the transport base does not deviate from the base transport path 402 through the upper-side opening 411.

The upper-side opening 411 is provided on the transport path 401, and the transport tables 550 and 550 attached to the transport base 510 are positioned above the upper-side opening 411. It is thus possible to transport a transport target wider than the transport body 500.

<Travel Control Unit>

At an appropriate location in the longitudinal direction of the transport path 401, at least one unit section 910 is set as a section to detect a conjunct traveling pair 250 and control the traveling state of the conjunct traveling pair 250. Each unit section 910 includes one travel control unit 900. The travel control unit 900 is configured by including at least one detection coil 901 and at least one control coil 903. The travel control unit 900 in this example is a coil unit made up of a plurality of coils.

The detection coil 901 detects a traveling moving body 200 and a traveling transport body 500. The control coil 903 controls the traveling state of the moving body 200 and the transport body 500. A portion of the unit section 910 where detection coils 901 . . . are located is a detection section 911. Another portion of the unit section 910 where control coils 903 are located is a control section 913.

The detection coil 901 is located at an upstream-side end portion of the unit section 910 in the travel direction of the conjunct traveling pair 250. The control coil 903 is located downstream of the detection coil 901 in the travel direction. The coils are arranged side by side along the travel direction.

The conjunct traveling pair 250 illustrated in this example travels (moves back and forth) in the forward direction (the x1 direction in FIG. 15) and in the reverse direction (the x2 direction in FIG. 15). Accordingly, opposite end portions of the unit section 910 illustrated in this example in the travel direction are set as detection sections 911 and 911, and an intermediate portion of the unit section 910 is set as a control section 913. That is, the travel control unit 900 illustrated in this example is configured by including the detection coils 901 and 901 located at each end portion of the unit section 910 in the longitudinal direction, and the control coils 903 . . . located in the intermediate portion of the unit section 910 in the longitudinal direction.

The detection coil 901 is configured to allow magnetic fields (magnetizing fields and magnetic fluxes) generated by the moving body magnets 213 (see FIG. 18, FIG. 4) of a traveling moving body 200 and by the transport body magnet 523 (see FIG. 4) of a traveling transport body 500 to sequentially pass through the inside of the detection coil 901, and generate an electric current according to the direction of each of the magnetic fields (magnetizing fields and magnetic fluxes). The detection coil 901 generates an induced current according to the traveling state of the moving body 200 and the transport body 500.

Each of the control coils 903 is configured to apply a predetermined magnetic force to the moving body magnets 213 and the transport body magnet 523 when passing a predetermined magnitude of electric current through the control coil.

Each of the detection coils 901 and the control coils 903 is constituted by, for example, an air core coil. The air core coil is an inductor that does not use a magnetic core made of ferromagnetic material. Examples of the air core coil include a coil containing only air in a hollow portion of a wire winding body, a coil wound on a non-magnetic material, and a coil with its cylindrical shape held by a non-magnetic material.

<Functional Block>

Figure 16:
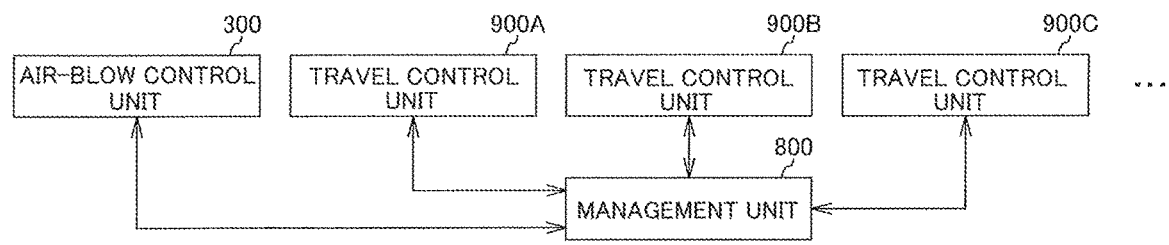
FIG. 16 is a functional block diagram of the transport system.
Figure 17:
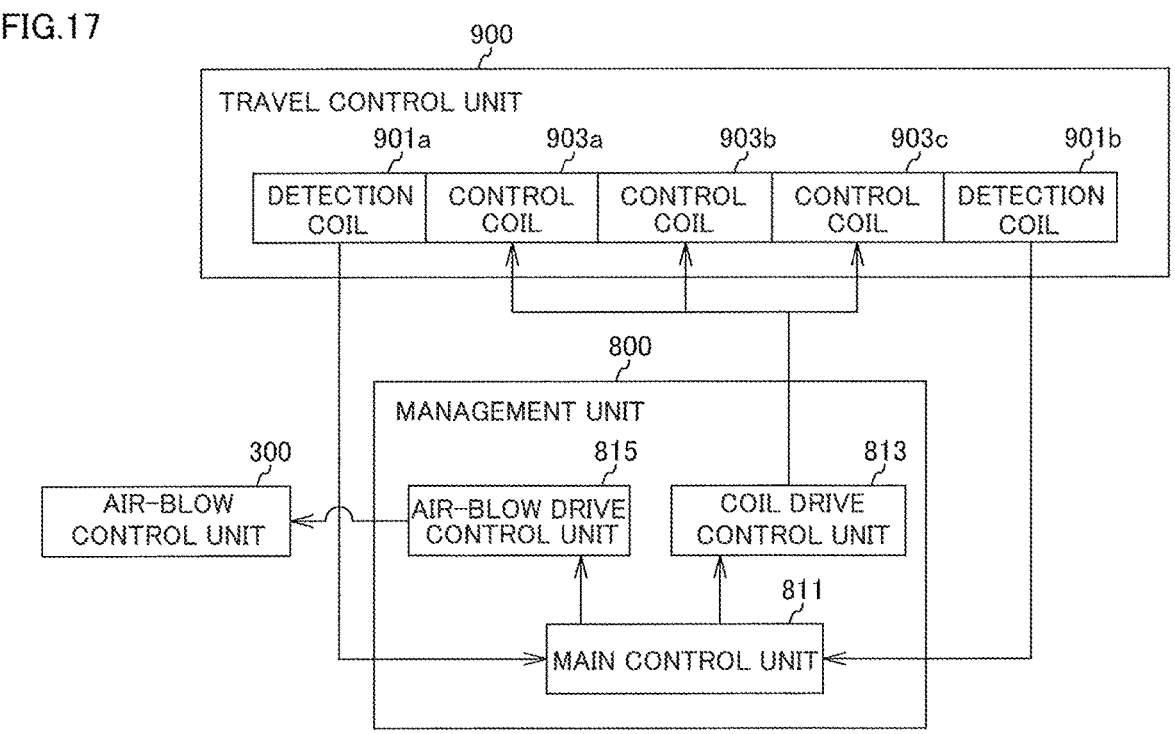
FIG. 17 is a block diagram illustrating the functions of the transport system in more detail.

FIG. 16 is a functional block diagram of the transport system according to one embodiment of the third invention. FIG. 17 is a block diagram illustrating the functions of the transport system in more detail.

As illustrated in FIG. 16, the transport system 10C includes the air-blow control unit 300 (FIG. 3), a plurality of travel control units 900 . . . , and the management unit 800 serving as control means that controls the air-blow control unit 300 and the travel control units 900 . . . .

As illustrated in FIG. 17, the management unit 800 includes a main control unit 811, a coil drive control unit 813, and an air-blow drive control unit 815. The main control unit 811 obtains a detection signal from the detection coils 901 to perform necessary computation and determine the control state of the respective units of the transport system 10C. The coil drive control unit 813 drives and controls the control coils 903. The air-blow drive control unit 815 drives and controls the air-blow control unit 300. The main control unit 811, the coil drive control unit 813, and the air-blow drive control unit 815 are implemented by a CPU included in the management unit 800 by reading control programs stored in a ROM, loading them into a RAM, and executing them.

The coil drive control unit 813 controls and supplies each of the control coils 903 with power to generate a predetermined magnetic field. For example, in a case of preventing (blocking) the moving body 200 and the transport body 500 from traveling, the coil drive control unit 813 supplies the control coil 903 with power to cause the control coil 903 to attract the moving body magnets 213 against an air flow flowing within the air blowing tube 100 in order to control and prevent (block) the moving body 200 from traveling, and also supplies the control coil 903 with power to cause the control coil 903 to attract the transport body magnet 523 in order to control and prevent (block) the transport body 500 from traveling.

<Detection and Travel Blocking Control>

FIGS. 18A to 18G are schematic diagrams for explaining detection of, and travel blocking control for, a moving body and a transport body. The open arrow pointing toward the x1 direction in FIGS. 18A to 18G shows an air flow.

The moving body 200 illustrated as an example includes two moving body magnets 213a and 213b, and the transport body 500 illustrated as an example includes one transport body magnet 523. The moving body magnets 213 (213a and 213b) installed on the moving body 200 and the transport body magnet 523 installed on the transport body 500 are in orientations in which they repel each other.

The travel control unit 900 is configured by including detection coils 901a and 901b located at opposite end portions in the travel direction, and three control coils 903a, 903b, and 903c located between the detection coils 901a and 901b. The positional relation between the control coils 903 . . . (arrangement interval in the travel direction) is set to be the same as the positional relation between the moving body magnets 213a and 213b, and the transport body magnet 523 (arrangement interval in the travel direction that is the x1 and x2 directions) when the moving body 200 and the transport body 500 travel in conjunction with each other.

As illustrated in FIG. 18A, when the moving body magnet 213b passes by the detection coil 901a, a magnetic flux generated by the moving body magnet 213b (upwardly in FIG. 18A) penetrates the detection coil 901a. This causes an electric current to flow through the detection coil 901a in a first direction due to electromagnetic induction.

As illustrated in FIG. 18B, when the transport body magnet 523 passes by the detection coil 901a, a magnetic flux generated by the transport body magnet 523 (downwardly in FIG. 18B) penetrates the detection coil 901a. This causes an electric current to flow through the detection coil 901a in a second direction opposite to the first direction due to electromagnetic induction. Since the transport body magnet 523 is located in such an orientation as to repel the moving body magnet 213a, the electric current flows through the detection coil 901a in the opposite direction.

As illustrated in FIG. 18C, when the moving body magnet 213a passes by the detection coil 901a, a magnetic flux generated by the moving body magnet 213a (upwardly in FIG. 18C) penetrates the detection coil 901a. This causes an electric current to flow through the detection coil 901a in the first direction due to electromagnetic induction.

The detection coil 901 generates an induced current according to the intensity and direction of each of the magnetic fields generated by the moving body magnets 213a and 213b and the transport body magnet 523, and according to the movement direction of each of the magnets. As described above, the moving body 200 and the transport body 500 pass by the detection coil 901a, and consequently an alternating current with a frequency according to the travel speed of the moving body 200 and the transport body 500 is generated in the detection coil 901a. Therefore, the main control unit 811 can calculate the travel speed of the moving body 200 and the transport body 500 based on the frequency of this alternating current.

Based on the frequency and the number of cycles of the alternating current output by the detection coil 901a, the main control unit 811 in the management unit 800 computes the timings at which the moving body magnets 213a and 213b and the transport body magnet 523 reach their corresponding control coils 903 to 903. The main control unit 811 further calculates the intensity of the magnetic force that can block the moving body 200 and the transport body 500 from traveling as necessary.

As illustrated in FIG. 18D, the coil drive control unit 813 drives each of the control coils 903 to 903 at the timings computed by the main control unit 811. That is, the coil drive control unit 813 controls and supplies each of the control coils 903 to 903 with necessary power, such that the control coils 903a and 903c (first control coils) attract the moving body magnets 213a and 213b against an air flow flowing within the air blowing tube 100, and the control coil 903b (second control coil) attracts the transport body magnet 523, in order to block the moving body 200 and the transport body 500 from traveling. During the period for which the control coils 903 are supplied with power, the moving body 200 and the transport body 500 stop in a state of being positioned within the control section 913.

When the travel control unit 900 blocks the moving body 200 and the transport body 500 from traveling, the air-blow drive control unit 815 may control driving of the air-blow control unit 300 so as to stop an air flow within the air blowing tube 100.

As illustrated in FIGS. 18E to 18G, when the power supply to the control coils 903 to 903 stops, the moving body 200 starts traveling while receiving an air flow flowing within the air blowing tube 100, and the transport body 500 starts traveling in conjunction with the moving body 200.

When the moving body magnets 213a and 213b and the transport body magnet 523 pass by the detection coil 901b, an alternating current flows through the detection coil 901b. It is thus possible to detect the start of traveling of the moving body 200 and the transport body 500 based on the alternating current.

In FIGS. 18, while the moving body 200 and the transport body 500 travel in the x1 direction, a case where the moving body 200 and the transport body 500 travel in the x2 direction is also described in the same manner as for the x1 direction. When the moving body 200 and the transport body 500 move in both the x1 direction and the x2 direction, it is preferable in the travel control unit 900 that the detection coils 901 and the control coils 903 are arranged symmetrically with respect to the travel direction.

The number of control coils 903 included in the travel control unit 900 may be equal to the total number of the moving body magnets 213 . . . and the transport body magnets 523 . . . , or may be less than the total number.

The control coils 903 . . . illustrated in this example can attract the moving body magnets 213 or can also attract the transport body magnet 523 depending on the driving state of the control coils 903 (direction of an electric current).

However, the travel control unit 900 may include the control coils (903a and 903c) located or configured to apply a magnetic force (attracting force) only to the moving body magnets 213, and the control coil (903b) located or configured to apply a magnetic force (attracting force) only to the transport body magnet 523.

Effects

As described above, in the present embodiment, the moving body 200 and the transport body 500 stop in a state of being positioned within the control section 913.

Since attraction based on a magnetic force is used to stop the moving body 200 and the transport body 500 from traveling, it is possible to easily and suddenly stop (suddenly apply a brake to) the moving body 200 and the transport body 500.

Similarly to the above, in a case of stopping the moving body 200 and the transport body 500 with an air flow being stopped in the air blowing tube 100, it is also possible to stop the moving body 200 and the transport body 500 within the control section 913 in a state of being positioned at a predetermined location.

Second Embodiment

Figure 19:
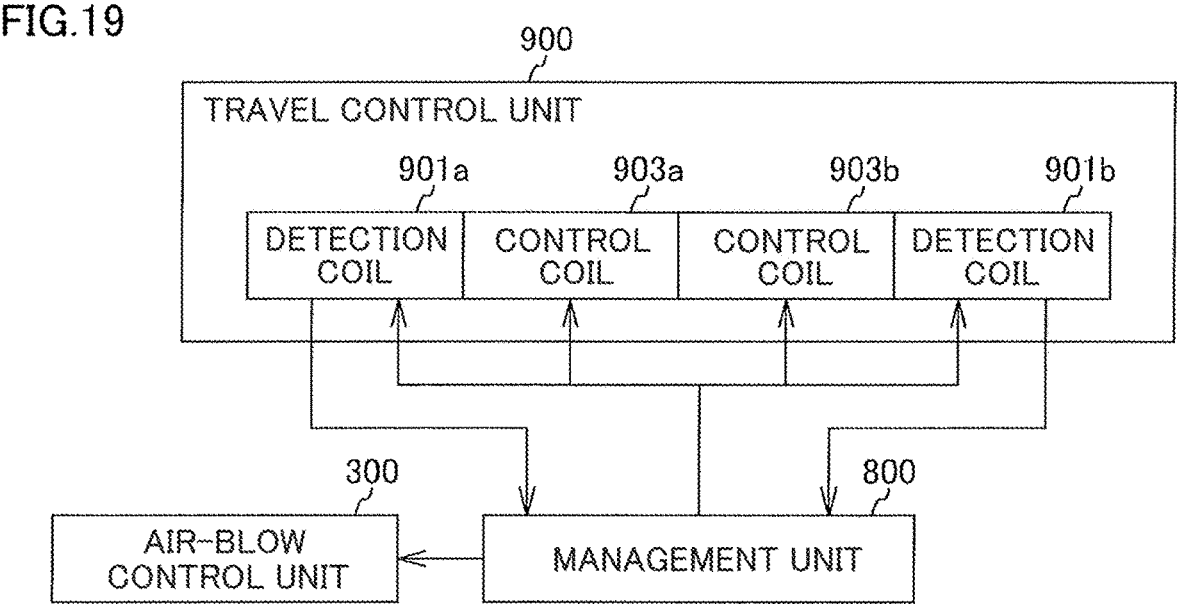
FIG. 19 is a functional block diagram of a transport system according to a second embodiment of the third invention.

FIG. 19 is a functional block diagram of a transport system according to a second embodiment of the third invention. FIGS. 20A to 20G are schematic diagrams for explaining detection of, and travel blocking control for, a moving body and a transport body.

The present embodiment is characterized in that detection coils located at end portions of the travel control section in the travel direction also serve as a control coil. Configurations identical to those of the first embodiment are denoted by like reference signs and explanations thereof are omitted as appropriate.

As illustrated in FIGS. 20A to 20G, the travel control unit 900 includes the detection coils 901a and 901b at the end portions in the travel direction (x1 and x2 directions), and further includes the control coils 903a and 903b in the intermediate portion in the travel direction. The detection coils 901a and 901b, and the control coils 903a and 903b are all air core coils. The detection coils 901a and 901b also function as a control coil.

Detection of, and travel blocking control for, the moving body and the transport body are executed in the following manner.

Figure 20:
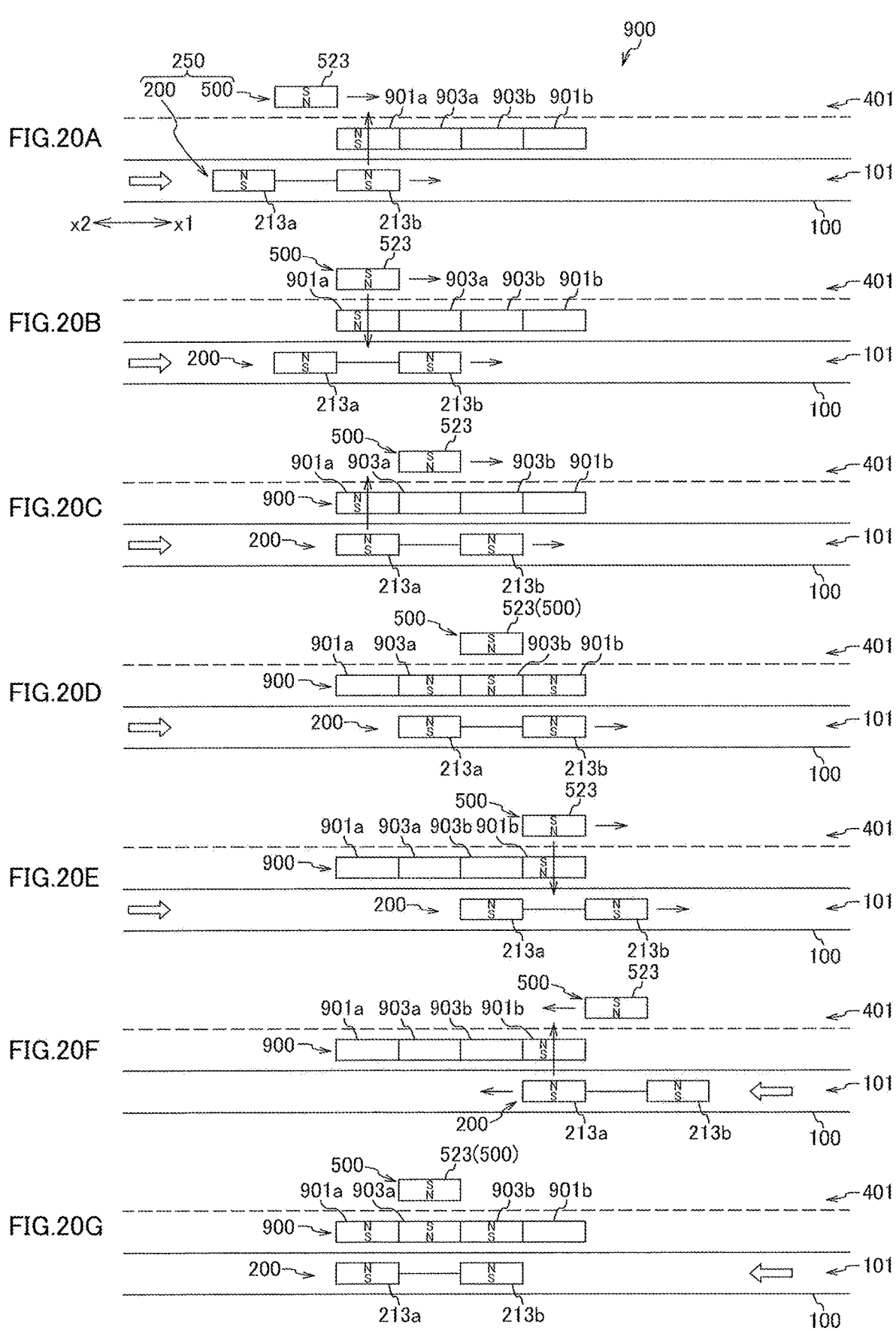
FIGS. 20A to 20G are schematic diagrams for explaining detection of, and travel blocking control for, the moving body and the transport body.

FIGS. 20A to 20C are the same as FIGS. 18A to 18C.

As illustrated in FIG. 20D, the coil drive control unit 813 (FIG. 17) drives the coils such that the control coil 903a (the first control coil) and the detection coil 901b (the first control coil) attract the moving body magnets 213a and 213b respectively, and the control coil 903b (the second control coil) attracts the transport body magnet 523. This blocks the moving body 200 and the transport body 500 from traveling.

As illustrated in FIG. 20E, when power supply to the control coils 903 to 903 stops, the moving body 200 starts traveling while receiving an air flow flowing within the air blowing tube 100, and the transport body 500 starts traveling in conjunction with the moving body 200.

As illustrated in FIG. 20F, when an air flow flows in the x2 direction and the moving body 200 and the transport body 500 travel in the x2 direction, the main control unit 811 (FIG. 17) detects travel of the moving body 200 and the transport body 500 based on an alternating current flowing through the detection coil 901b.

As illustrated in FIG. 20G, the coil drive control unit 813 (FIG. 17) drives the coils such that the control coil 903b (the first control coil) and the detection coil 901a (the first control coil) attract the moving body magnets 213b and 213a respectively, and the control coil 903a (the second control coil) attracts the transport body magnet 523. This blocks the moving body 200 and the transport body 500 from traveling.

As described in this example, when the moving body 200 and the transport body 500 travel in the forward and reverse directions, the detection coil 901 also functions as a control coil, so that it is possible to reduce the total number of coils included in the travel control unit 900. The function of each coil is switched to another according to the travel direction of the moving body 200 and the transport body 500.

The arrangement interval of the detection coils 901 . . . and the control coils 903 in the travel direction is set to be the same as the positional relation between the moving body magnets 213a and 213b, and the transport body magnet 523 (arrangement interval in the travel direction that is the x1 and x2 directions) when the moving body 200 and the transport body 500 travel in conjunction with each other.

Third Embodiment

Figure 21:
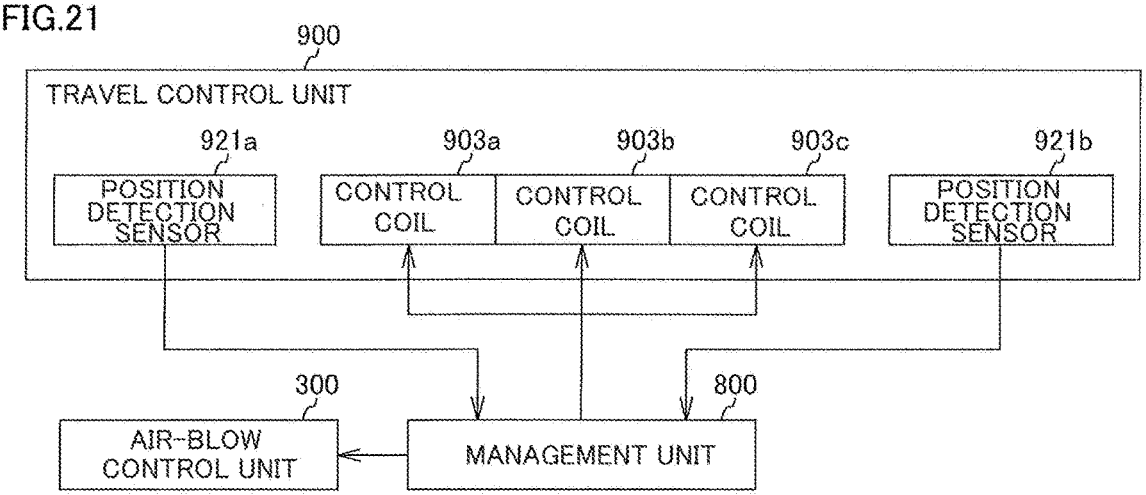
FIG. 21 is a functional block diagram of a transport system according to a third embodiment of the third invention.

FIG. 21 is a functional block diagram of the transport system according to a third embodiment of the third invention. Configurations identical to those of the first and second embodiments are denoted by like reference signs and explanations thereof are omitted as appropriate.

As illustrated in FIG. 21, other types of position detection sensors 921 (921a and 921b) other than coils may be used as means that detects a traveling moving body 200 and a traveling transport body 500. As the position detection sensors 921, for example, a transmissive or reflective phototransistor can be used. The transport system includes the position detection sensors 921, where the quantity of the position detection sensors is sufficient to enable a travel prevention control for the moving body 200 and the transport body 500 to be executed. Each of the position detection sensors 921 is located at such a position as to enable the travel prevention control described above to be executed.

Fourth Embodiment

Figure 22A:
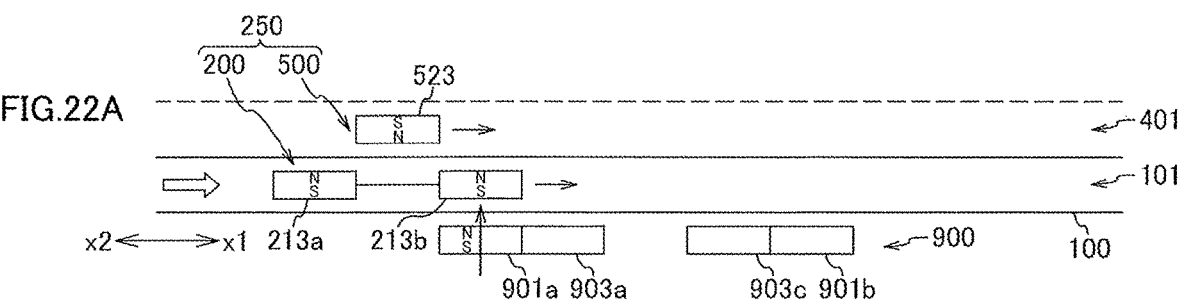
FIGS. 22A and 22B are schematic diagrams for explaining a travel control unit according to a fourth embodiment of the third invention.
Figure 22B:
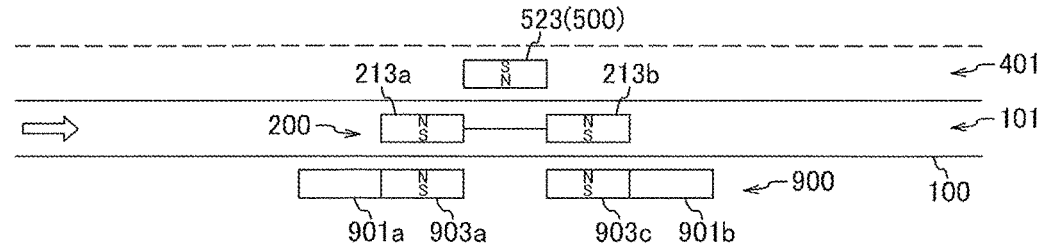

FIGS. 22A and 22B are schematic diagrams for explaining a travel control unit according to a fourth embodiment of the third invention. Configurations identical to those of the first to third embodiments are denoted by like reference signs and explanations thereof are omitted as appropriate.

As the travel control unit 900 blocks the moving body 200 from traveling, the transport body 500 is accordingly blocked from traveling in conjunction with the moving body 200. In view of that, it suffices that the travel control unit 900 can block at least the moving body 200 from traveling.

That is, the travel control unit 900 may include only the control coils 903a and 903c that apply a magnetic force to the moving body magnets 213. In this case, the control coils 903a and 903c are located according to the arrangement interval of the moving body magnets 213a and 213b. FIGS. 22A and 22B illustrate an example in which the control coils 903 are provided and attached to a side surface of the air blowing tube 100 opposite to the transport path 401 to prevent a magnetic force of the control coils 903 from acting on the transport body magnet 523.

As means that detects one or both of the moving body 200 and the transport body 500, a detection coil (an air core coil) may be used, or other types of position detection sensors may be used.

Fifth Embodiment

Figure 23:
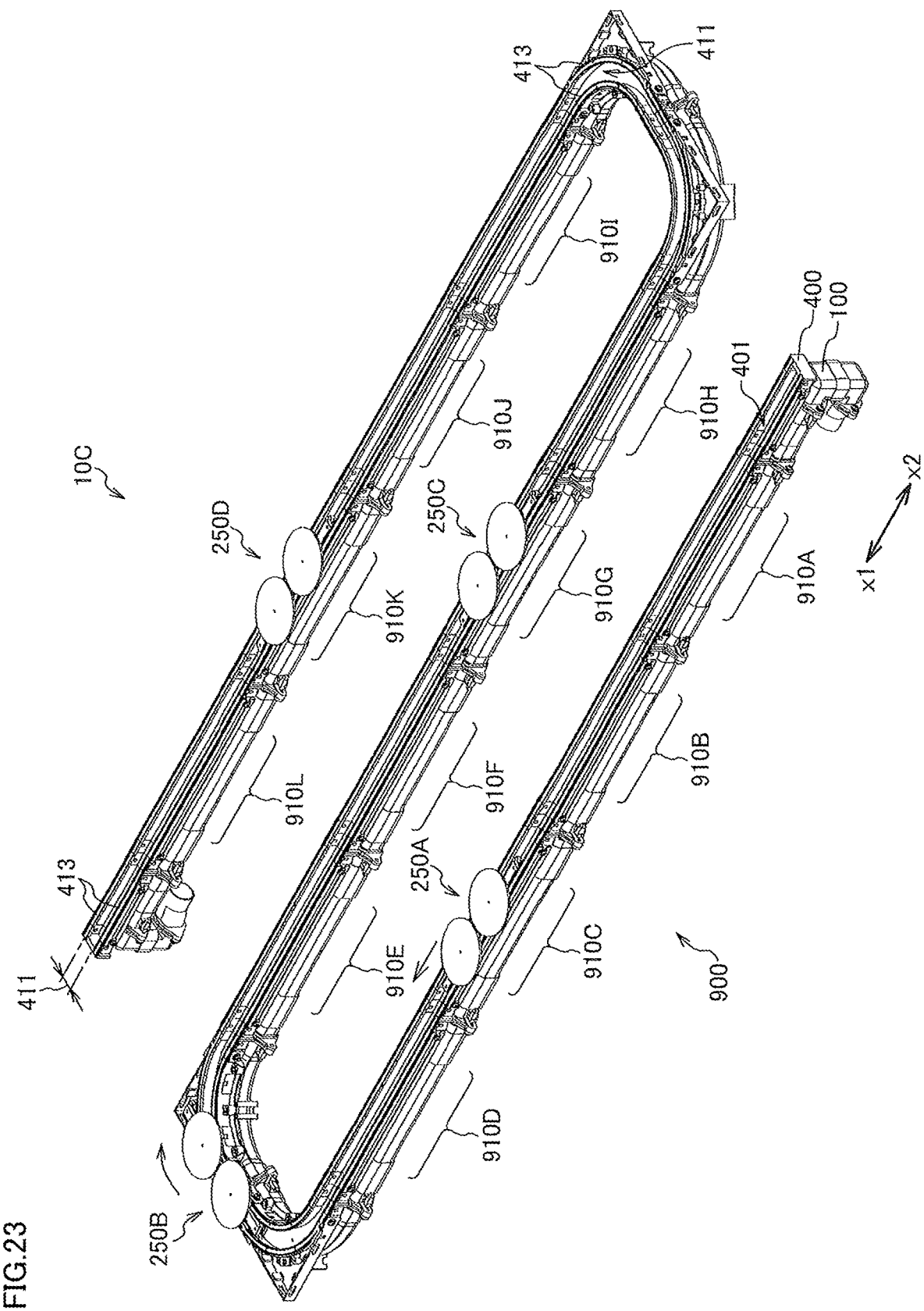
FIG. 23 is a schematic diagram for explaining a travel control unit according to a fifth embodiment of the third invention.

FIG. 23 is a perspective view illustrating a schematic configuration of the transport system according to a fifth embodiment of the third invention. Configurations identical to those of the first to fourth embodiments are denoted by like reference signs and explanations thereof are omitted as appropriate.

A plurality of unit sections 910A to 910L are set on the transport path 401 of the transport system 10C. In the unit sections 910A, 910B . . . , the travel control units 900, 900 . . . illustrated in FIG. 15 and the like (900A, 900B ... illustrated in FIG. 16) are located respectively. In the transport path 401, a plurality of conjunct traveling pairs 250A to 250D are located to be capable of traveling.

As illustrated in FIG. 16, the travel control units 900A, 900B ... are individually driven and controlled by the management unit 800. This can individually prevent the conjunct traveling pairs 250A to 250D from traveling on the transport path 401.

For example, in synchronization with the timings at which the conjunct traveling pairs 250C and 250D, some of those illustrated in FIG. 23, pass through the unit sections 910G and 910K, the control coils in the travel control units 900 located in these unit sections 910G and 910K are driven. This prevents the conjunct traveling pairs 250C and 250D from traveling. At this time, unless an air flow within the air blowing tube 100 is stopped and unless the control coils in the other unit sections 910A to 910F, 910H to 910J, and 910L are driven, it is still possible to cause the other conjunct traveling pairs 250A and 250B to travel continuously.

As described above, according to the present embodiment, even in a case of causing the plurality of conjunct traveling pairs 250A to 250D to travel on the transport path 401, it is still possible to individually control travel of the conjunct traveling pairs 250 . . . .

Summary of Configurations, Actions, and Effects of Third Invention

A transport system 10C according to the present aspect includes: an air flow generating device (a blower 310); an air blowing tube 100 that forms therein a flow path of an air flow generated by the air flow generating device; a moving body 200 that travels inside the air blowing tube while receiving an air flow flowing within the air blowing tube; a transport body route (a transport path 401) that has at least a portion arranged along the air blowing tube to be adjacent to the air blowing tube; and a transport body 500 that is configured to be able to retain a transport target and that travels inside the transport body route. The moving body includes a moving body magnetic material (moving body magnets 213), while the transport body includes a transport body magnetic material (a transport body magnet 523). The transport system has a configuration to move the transport body in conjunction with movement of the moving body by using repulsion based on a magnetic force applied between the moving body magnetic material and the transport body magnetic material when there is a proximal positional relation between the moving body magnetic material and the transport body magnetic material.

First Aspect

A transport system 10C according to the present aspect includes a control coil 903 that controls a traveling state of the moving body 200, and drive control means (a coil drive control unit 813) driving and controlling the control coil. The control coil is configured to apply a magnetic force to the moving body magnetic material (moving body magnets 213). The drive control means supplies the control coil with power to cause the control coil to attract the moving body magnetic material against an air flow flowing within the air blowing tube 100 in order to control and prevent the moving body from traveling.

In the present aspect, the moving body stops as the control coil attracts the moving body magnetic material. In the present aspect, it is possible to block the moving body from traveling regardless of the presence or absence of an air flow. Therefore, even if a plurality of moving bodies travel inside the air blowing tube, some of the moving bodies are blocked from traveling by the control coil, while the other moving bodies are allowed to continuously travel in accordance with the direction of an air flow.

The transport body moves in conjunction with the moving body. Thus, as at least the moving body is blocked from traveling, the transport body is accordingly blocked from traveling. That is, according to the present aspect, it is possible to transport a transport target with increased flexibility.

It suffices that the control coil is in such a positional relation as to apply a magnetic force to the moving body magnetic material. The control coil may be located between the air blowing tube 100 and the transport body route (the transport path 401), or may be provided and attached to a side surface of the air blowing tube opposite to the transport body route.

Second Aspect

A transport system 10C according to the present aspect includes first and second control coils 903a to 903c that control a traveling state of the moving body 200 and the transport body 500, and drive control means (a coil drive control unit 813) driving and controlling the first and second control coils. The first control coils 903a and 903c are configured to apply a magnetic force to the moving body magnetic material (the moving body magnets 213), and the second control coil 903b is configured to apply a magnetic force to the transport body magnetic material (the transport body magnet 523). The drive control means supplies the first control coils with power to cause the first control coils to attract the moving body magnetic material against an air flow flowing within the air blowing tube 100 in order to control and prevent the moving body from traveling, and also supplies the second control coil with power to cause the second control coil to attract the transport body magnetic material in order to control and prevent the transport body from traveling.

In the present aspect, the moving body stops as the control coils attract the moving body magnetic material, and the transport body stops as the control coil attracts the transport body magnetic material. In the present aspect, it is possible to block the moving body and the transport body from traveling regardless of the presence or absence of an air flow. Therefore, even if a plurality of moving bodies travel inside the air blowing tube and a plurality of transport bodies travel inside the transport body route, some of the moving bodies and transport bodies are blocked from traveling by the control coils, while the other moving bodies and transport bodies are allowed to continuously travel in accordance with the direction of an air flow.

According to the present aspect, it is possible to transport a transport target with increased flexibility.

In the present aspect, not only the moving body, but the transport body are also blocked from traveling by the control coils. This can prevent the transport body from being out of the conjunct state with the moving body at the time when the moving body stops.

It suffices that the first and second control coils are in such a positional relation as to apply a magnetic force to their corresponding magnetic materials. For example, the first control coils may be located between the air blowing tube 100 and the transport body route (the transport path 401), or may be provided and attached to a side surface of the air blowing tube opposite to the transport body route. The same applies to the second control coil.

Third Aspect

A transport system 10C according to the present aspect is different from the second aspect in that the first and second control coils 903 are located between the air blowing tube 100 and the transport body route (the transport path 401).

The present aspect also achieves the same effects as those obtained in the second aspect.

Fourth Aspect

A transport system 10C according to the present aspect includes a detection coil 901 that detects a traveling state of the moving body 200 and the transport body 500 and is located between the air blowing tube 100 and the transport body route (the transport path 401). The detection coil is configured to generate an induced current according to the traveling state of the moving body and the transport body as magnetic fluxes generated by the moving body magnetic material (the moving body magnets 213) and the transport body magnetic material (the transport body magnet 523) sequentially pass through the detection coil.

It is possible to use a commonly-known detection sensor such as a transmissive photosensor or a reflective photosensor as means that detects the moving body and the transport body. Assuming that the transport system has a configuration to move a magnetic material along the transport body route, since the commonly-known detection sensor described above does not employ the transport principle of the transport system, there is still some room for further streamlining the transport system.

In the present aspect, the transport body moves in conjunction with movement of the moving body by using repulsion based on a magnetic force applied between the moving body magnetic material and the transport body magnetic material. Therefore, when the detection coil is located between the air blowing tube and the transport body route, an alternating current is generated in the detection coil according to the traveling state of the moving body and the transport body. In the present aspect, it is possible to detect the traveling state of the moving body and the transport body based on the state of an induced current flowing through the detection coil. Since a magnetic force of the magnetic materials included in the moving body and the transport body is used to detect these moving body and transport body, the transport system is designed in a streamlined manner.

Fifth Aspect

A transport system 10C according to the present aspect includes: a travel control unit 900 configured by including a detection coil 901 that detects a traveling state of the moving body 200 and the transport body 500, and first and second control coils 903a to 903c that control the traveling state of the moving body and the transport body; and drive control means (a coil drive control unit 813) driving and controlling the control coils. The detection coil is configured to generate an induced current according to the traveling state of the moving body and the transport body when magnetic fluxes generated by the moving body magnetic material (the moving body magnets 213) and the transport body magnetic material (the transport body magnet 523) sequentially pass through the detection coil. The first control coils 903a and 903c are configured to apply a magnetic force to the moving body magnetic material, and the second control coil 903b is configured to apply a magnetic force to the transport body magnetic material.

Furthermore, in the present aspect, the first and second control coils are located downstream of the detection coil in a travel direction of the moving body and the transport body at an interval corresponding to an interval between the moving body magnetic material and the transport body magnetic material that move in conjunction with each other.

The effects achieved by the configurations included in the present aspect and illustrated in each of the aforementioned aspects are as described above in each of the aforementioned embodiments.

In the present aspect, the first and second control coils located downstream of the detection coil in the travel direction are driven and controlled based on the traveling state of the moving body and the transport body detected by the detection coil.

In the present aspect, the first and second control coils are located at an interval corresponding to the interval between the moving body magnetic material and the transport body magnetic material that move in conjunction with each other, so that it is possible to prevent both the moving body and the transport body from traveling, while maintaining the positional relation in which the moving body and the transport body move in conjunction with each other. Therefore, it is possible to stop the moving body and the transport body in a state of being positioned in a predetermined positional relation between them.

Sixth Aspect

In the transport system 10C according to the present aspect, in the fifth aspect, the drive control means (the coil drive control unit 813) supplies the first control coils 903a and 903c with power to cause the first control coils to attract the moving body magnetic material (the moving body magnets 213) against an air flow flowing within the air blowing tube 100 in order to control and prevent the moving body 200 from traveling, and also supplies the second control coil 903b with power to cause the second control coil to attract the transport body magnetic material (the transport body magnet 523) in order to control and prevent the transport body 500 from traveling.

In the present aspect, the moving body stops as the control coils attract the moving body magnetic material, and the transport body stops as the control coil attracts the transport body magnetic material. In the present aspect, it is possible to block the moving body and the transport body from traveling regardless of the presence or absence of an air flow.

Seventh Aspect

A transport system 10C according to the present aspect is different from the sixth aspect in that the transport system 10C includes a plurality of travel control units 900A, 900B . . . and causes a plurality of conjunct traveling pairs 250 to travel. One conjunct traveling pair is configured by including one moving body 200 and one transport body 500 that moves in conjunction with the one moving body.

In the present aspect, when one of the travel control units blocks one of the conjunct traveling pairs from traveling in a state in which an air flow flows within the air blowing tube 100, the drive control means (the coil drive control unit 813) supplies the first control coils 903a and 903c in the one travel control unit with power to cause the first control coils to attract the moving body magnetic material (the moving body magnets 213) in the one conjunct traveling pair against the air flow flowing within the air blowing tube in order to control and prevent the moving body from traveling, and also supplies the second control coil 903*b* in the one travel control unit with power to cause the second control coil to attract the transport body magnetic material (the transport body magnet 523) in the one conjunct traveling pair in order to control and prevent the transport body from traveling.

According to the present aspect, in a case of causing a plurality of conjunct traveling pairs to travel, some of the conjunct traveling pairs are blocked from traveling by the control coils, while the other conjunct traveling pairs are allowed to continuously travel in accordance with the direction of the air flow without stopping the air flow.

Eighth Aspect

In the transport system 10C according to the present aspect, the control coils 903 are air core coils.

The air core coil does not have a ferromagnetic core. This can prevent the control coil from attracting the traveling moving body magnetic material (the moving body magnets 213) and the traveling transport body magnetic material (the transport body magnet 523), and thus from reducing their traveling force. Therefore, the moving body and the transport body pass by the control coils when the control coils are not driven, and are prevented from traveling when the control coils are driven.

Ninth Aspect

In the transport system 10C according to the present aspect, the detection coil 901 is an air core coil.

The air core coil does not have a ferromagnetic core. This can prevent the detection coil from attracting the traveling moving body magnetic material (the moving body magnets 213) and the traveling transport body magnetic material (the transport body magnet 523), and thus from reducing their traveling force.

Tenth Aspect

In the transport system 10C according to the present aspect, the detection coil 901 and the first and second control coils 903*a* to 903*c* are air core coils, and the detection coil serves also as any of the control coils.

The air core coil does not have a ferromagnetic core. This can prevent the coils from attracting the traveling moving body magnetic material (the moving body magnets 213) and the traveling transport body magnetic material (the transport body magnet 523), and thus from reducing their traveling force.

Both the detection coil and the control coils are constituted by an air core coil, so that the air core coil can function as a detection coil or can also function as a control coil. The detection coil serves also as a control coil, which can downsize the travel control unit 900 configured by including the detection coil and the control coils, and can accordingly simplify the configuration of the travel control unit.

For example, when the moving body 200 and the transport body 500 move back and forth in the forward direction and the reverse direction, the air core coil positioned at an upstream-side end portion in the travel direction can function as a detection coil according to the travel direction of the moving body and the transport body. In this case, the air core coil that functions as a control coil switches its function from a detection coil to a control coil so as to attract the moving body magnetic material or the transport body magnetic material according to the travel direction of the moving body and the transport body.

Eleventh Aspect

In the transport system 10C according to the present aspect, the first and second control coils 903*a* to 903*c* are located along a travel direction of the moving body 200 and the transport body 500 at an interval corresponding to an interval between the moving body magnetic material (the moving body magnets 213) and the transport body magnetic material (the transport body magnet 523) that move in conjunction with each other.

The first and second control coils are located at an interval corresponding to the interval between the moving body magnetic material and the transport body magnetic material that move in conjunction with each other, so that it is possible to prevent both the moving body and the transport body from traveling, while maintaining the positional relation in which the moving body and the transport body move in conjunction with each other. Therefore, it is possible to stop the moving body and the transport body in a state of being positioned in a predetermined positional relation between them.

Twelfth Aspect

In the transport system 10C according to the present aspect, based on the traveling state of the moving body 200 and the transport body 500 detected by the induced current, the drive control means (the coil drive control unit 813) controls and supplies the first control coils 903*a* and 903*c* with power in synchronization with a timing at which the moving body magnetic material (the moving body magnets 213) reaches the first control coils, and also controls and supplies the second control coil 903*b* with power in synchronization with a timing at which the transport body magnetic material (the transport body magnet 523) reaches the second control coil.

The first and second control coils are driven and controlled in synchronization with the timing at which the moving body and the transport body reach the first and second control coils based on the traveling state of the moving body and the transport body detected by the detection coil.

REFERENCE SIGNS LIST arrow A, A1, A2 (circulation direction), arrow B, B1, B2 (banknote collecting direction), arrow C, C1, C2 (transport body returning direction), arrow x1, x2 travel direction, L, L1, L2 game hall facility, 1 game machine, 2 sandwiched machine, 10 banknote transport system, 10C transport system, 100 air blowing tube, 100*a* one end portion, 100*b* other end portion, 101 air flow path, 110 first air blowing tube, 111 moving route part, 120 second air blowing tube, 200 moving body, 210 divided piece, 211 hinge part, 213, 213*a*, 213*b* moving body magnet, 250, 250A to 250D conjunct traveling pair, 300, 300B, 300C air-blow control unit, 310, 310*a*, 310*b* blower (air flow generating device), 320 switching unit, 321 casing, 323 flow path, 323*a* first flow path, 323*b* second flow path, 323*c* third flow path, 323*d* fourth flow path, 325 switching valve, 330 first circulation pipe, 330*a* one end portion, 330*b* other end portion, 331 discharge tube, 333 intake tube, 340 connection pipe, 400 transport tube, 401 transport path, 402 base transport path, 403 banknote transport path, 405 concave portion, 411 upper-side opening, 413 elongated convex protrusion, 450 keeping part, 500 transport body, 510 transport base, 520 divided piece, 520a internal space, 520b protrusion, 520c inner region, 521 hinge part, 523 transport body magnet, 525 roller, 540 banknote collecting/retaining part, 541 support member, 541a pivotally support part, 541b spring, 544 collecting pawl (collecting member), 544a base end piece, 544b intermediate piece, 544c end portion piece, 545 roller, 550 transport table, 600 receiving unit, 700 cashbox unit, 800 management unit, 801 housing, 811 main control unit, 813 coil drive control unit, 815 air-blow drive control unit, 900, 900A, 900B travel control unit, 901, 901a, 901b detection coil, 903 903a to 903c control coil, 910, 910A to 910L unit section, 911 detection section, 913 control section, 921 position detection sensor.

What is claimed is:

1. A transport system comprising: an air flow generating device; an air blowing tube that forms therein a flow path of an air flow generated by the air flow generating device; a moving body that travels inside the air blowing tube while receiving an air flow flowing within the air blowing tube; a transport body route that has at least a portion arranged along the air blowing tube to be adjacent to the air blowing tube; and a transport body that is configured to be able to retain a transport target and that travels inside the transport body route, where the moving body includes a moving body magnetic material, while the transport body includes a transport body magnetic material, and the transport system has a configuration to move the transport body in conjunction with movement of the moving body by using repulsion based on a magnetic force applied between the moving body magnetic material and the transport body magnetic material when there is a proximal positional relation between the moving body magnetic material and the transport body magnetic material, wherein the transport system comprises a first control coil that controls a traveling state of the moving body, and drive control means driving and controlling the first control coil, the first control coil is configured to apply a magnetic force to the moving body magnetic material, and the drive control means supplies the first control coil with power to cause the first control coil to attract the moving body magnetic material against an air flow flowing within the air blowing tube in order to control and prevent the moving body from traveling.

2. The transport system according to claim 1, wherein the first control coil is an air core coil.

3. The transport system according to claim 1, wherein the transport system comprises a second control coil that control a traveling state of the transport body, and drive control means driving and controlling the second control coil, the second control coil is configured to apply a magnetic force to the transport body magnetic material, and the drive control means supplies the second control coil with power to cause the second control coil to attract the transport body magnetic material in order to control and prevent the transport body from traveling.

4. The transport system according to claim 3, wherein the first control coil and the second control coil are air core coils.

5. The transport system according to claim 3, wherein the first control coil and the second control coil are located along a travel direction of the moving body and the transport body at an interval corresponding to an interval between the moving body magnetic material and the transport body magnetic material that move in conjunction with each other.

6. The transport system according to claim 3, wherein the first control coil and the second control coil are located between the air blowing tube and the transport body route.

7. The transport system according to claim 6, wherein the first control coil and the second control coil are air core coils.

8. The transport system according to claim 6, wherein the first control coil and the second control coil are located along a travel direction of the moving body and the transport body at an interval corresponding to an interval between the moving body magnetic material and the transport body magnetic material that move in conjunction with each other.

9. The transport system according to claim 3, wherein the transport system comprises:

a travel control unit configured by including a detection coil that detects a traveling state of the moving body and the transport body, and the first control coil and the second control coil, the detection coil is configured to generate an induced current according to the traveling state of the moving body and the transport body when magnetic fluxes generated by the moving body magnetic material and the transport body magnetic material sequentially pass through the detection coil, and the first control coil and the second control coil are located downstream of the detection coil in a travel direction of the moving body and the transport body at an interval corresponding to an interval between the moving body magnetic material and the transport body magnetic material that move in conjunction with each other.

10. The transport system according to claim 9, wherein the first control coil and the second control coil are air core coils.

11. The transport system according to claim 9, wherein the detection coil is an air core coil.

12. The transport system according to claim 9, wherein the detection coil and the first control coil and the second control coil are air core coils, and the detection coil serves also as any of the first control coil and the second control coil.

13. The transport system according to claim 9, wherein based on the traveling state of the moving body and the transport body detected by the induced current, the drive control means controls and supplies the first control coil with power in synchronization with a timing at which the moving body magnetic material reaches the first control coil, and also controls and supplies the second control coil with power in synchronization with a timing at which the transport body magnetic material reaches the second control coil.

14. The transport system according to claim 9, wherein the drive control means supplies the first control coil with power to cause the first control coil to attract the moving body magnetic material against an air flow flowing within the air blowing tube in order to control and prevent the moving body from traveling, and also supplies the second control coil with power to cause the second control coil to attract the transport body magnetic material in order to control and prevent the transport body from traveling.

15. The transport system according to claim 14, wherein the first control coil and the second control coil are air core coil.

16. The transport system according to claim 14, wherein the detection coil is an air core coil.

17. The transport system according to claim 14, wherein the detection coil and the first control coil and the second control coil are air core coils, and the detection coil serves also as any of the first control coil and the second control coil.

18. The transport system according to claim 14, wherein based on the traveling state of the moving body and the transport body detected by the induced current, the drive control means controls and supplies the first control coil with power in synchronization with a timing at which the moving body magnetic material reaches the first control coil, and also controls and supplies the second control coil with power in synchronization with a timing at which the transport body magnetic material reaches the second control coil.

19. A transport system comprising: an air flow generating device; an air blowing tube that forms therein a flow path of an air flow generated by the air flow generating device; a moving body that travels inside the air blowing tube while receiving an air flow flowing within the air blowing tube; a transport body route that has at least a portion arranged along the air blowing tube to be adjacent to the air blowing tube; and a transport body that is configured to be able to retain a transport target and that travels inside the transport body route,
where the moving body includes a moving body magnetic material, while the transport body includes a transport body magnetic material, and the transport system has a configuration to move the transport body in conjunction with movement of the moving body by using repulsion based on a magnetic force applied between the moving body magnetic material and the transport body magnetic material when there is a proximal positional relation between the moving body magnetic material and the transport body magnetic material, wherein
the transport system comprises a detection coil that detects a traveling state of the moving body and the transport body and is located between the air blowing tube and the transport body route, and the detection coil is configured to generate an induced current according to the traveling state of the moving body and the transport body as magnetic fluxes generated by the moving body magnetic material and the transport body magnetic material sequentially pass through the detection coil.

20. The transport system according to claim 19, wherein the detection coil is an air core coil.

21. A transport system comprising: an air flow generating device; an air blowing tube that forms therein a flow path of an air flow generated by the air flow generating device; a moving body that travels inside the air blowing tube while receiving an air flow flowing within the air blowing tube; a transport body route that has at least a portion arranged along the air blowing tube to be adjacent to the air blowing tube; and a transport body that is configured to be able to retain a transport target and that travels inside the transport body route,
where the moving body includes a moving body magnetic material, while the transport body includes a transport body magnetic material, and the transport system has a configuration to move the transport body in conjunction with movement of the moving body by using repulsion based on a magnetic force applied between the moving body magnetic material and the transport body magnetic material when there is a proximal positional relation between the moving body magnetic material and the transport body magnetic material, wherein the transport system comprises:
a plurality of travel control units, each of which is configured by including a detection coil that detects a traveling state of the moving body and the transport body, and a first control coil and a second control coil that control the traveling state of the moving body and the transport body; and
drive control means driving and controlling the first control coil and the second control coil,
in each of the travel control units, the detection coil is configured to generate an induced current according to the traveling state of the moving body and the transport body when magnetic fluxes generated by the moving body magnetic material and the transport body magnetic material sequentially pass through the detection coil, the first control coil is configured to apply a magnetic force to the moving body magnetic material, the second control coil is configured to apply a magnetic force to the transport body magnetic material, and the first control coil and the second control coil are located downstream of the detection coil in a travel direction of the moving body and the transport body at an interval corresponding to an interval between the moving body magnetic material and the transport body magnetic material that move in conjunction with each other,
the transport system causes a plurality of conjunct traveling pairs to travel, each of the conjunct traveling pairs including the moving body and the transport body that moves in conjunction with the moving body, and
when one travel control unit of the travel control units blocks one conjunct traveling pair of the conjunct traveling pairs from traveling in a state in which an air flow flows within the air blowing tube, the drive control means supplies the first control coil in the one travel control unit with power to cause the first control coil to attract the moving body magnetic material in the one conjunct traveling pair against the air flow flowing within the air blowing tube in order to control and prevent the moving body from traveling, and also supplies the second control coil in the one travel control unit with power to cause the second control coil to attract the transport body magnetic material in the one conjunct traveling pair in order to control and prevent the transport body from traveling.

22. The transport system according to claim 21, wherein the first control coil and the second control coil are air core coils.

23. The transport system according to claim 21, wherein the detection coil is an air core coil.

24. The transport system according to claim 21, wherein the detection coil and the first control coil and the second control coil are air core coils, and the detection coil serves also as any of the first control coil and the second control coil.

25. The transport system according to claim 21, wherein based on the traveling state of the moving body and the transport body detected by the induced current, the drive control means controls and supplies the first control coil with power in synchronization with a timing at which the moving body magnetic material reaches the first control coil, and also controls and supplies the second control coil with power in synchronization with a timing at which the transport body magnetic material reaches the second control coil.

* * * * *